United States Patent [19]
Omae et al.

[11] Patent Number: 5,929,954
[45] Date of Patent: Jul. 27, 1999

[54] LIQUID CRYSTAL DISPLAY DEVICE AND LIQUID CRYSTAL PROJECTION DISPLAY DEVICE HAVING A LIGHT DIRECTIVITY CONTROLLER OF LIGHT BEAMS

[75] Inventors: Hideki Omae, Suita; Hiroshi Takahara, Neyagawa; Yoshimasa Fushimi, Hirakata, all of Japan

[73] Assignee: Matsushita Electric Industrial Co., Ltd., Osaka, Japan

[21] Appl. No.: 08/980,777

[22] Filed: Dec. 1, 1997

Related U.S. Application Data

[62] Division of application No. 08/426,837, Apr. 24, 1995, Pat. No. 5,760,849.

[30] Foreign Application Priority Data

Apr. 22, 1994 [JP] Japan .................................. 6-083555
Dec. 27, 1994 [JP] Japan .................................. 6-324224

[51] Int. Cl.⁶ .................................................. G02F 1/1335
[52] U.S. Cl. ............................................. 349/95; 349/66
[58] Field of Search .............................. 349/57, 64, 66, 349/95, 112

[56] References Cited

U.S. PATENT DOCUMENTS

| | | |
|---|---|---|
| 3,744,878 | 7/1973 | Kiemle et al. . |
| 5,083,854 | 1/1992 | Zampolin et al. ......................... 349/95 |
| 5,128,783 | 7/1992 | Abileah et al. . |
| 5,161,041 | 11/1992 | Abileah et al. . |
| 5,280,371 | 1/1994 | McCartney, Jr. et al. ................. 349/64 |
| 5,329,388 | 7/1994 | Yoshimizu . |
| 5,379,137 | 1/1995 | Hirai et al. . |
| 5,396,350 | 3/1995 | Beeson et al. . |
| 5,442,467 | 8/1995 | Silverstein et al. ...................... 349/112 |
| 5,504,597 | 4/1996 | Sprague et al. ........................... 349/57 |
| 5,504,598 | 4/1996 | Sprague et al. ........................... 349/57 |
| 5,760,849 | 6/1998 | Omae et al. ................................ 349/5 |

FOREIGN PATENT DOCUMENTS

| | | |
|---|---|---|
| 54-66862 | 5/1979 | Japan . |
| 57-040285 | 3/1982 | Japan . |
| 04060538 | 2/1992 | Japan . |
| 04081816 | 3/1992 | Japan . |
| 05053100 | 3/1993 | Japan . |
| 5-88156 | 4/1993 | Japan . |
| 5-176206 | 7/1993 | Japan . |
| 6-095099 | 4/1994 | Japan . |
| 40-5095498 | 4/1995 | Japan . |

*Primary Examiner*—William L. Sikes
*Assistant Examiner*—James Dudek
*Attorney, Agent, or Firm*—McDermott, Will & Emery

[57] ABSTRACT

A liquid crystal display device comprises a light source, a diffusion plate for diffusing light beams emitted from the light source, and a liquid crystal panel for forming an image thereon as a result of a variation in scattering efficiency wherein the diffusion plate and liquid crystal panel are separately arranged with a distance between them, thereby the liquid crystal panel being illuminated by the diffused light beams uniformly, and a liquid crystal projection display device further comprises a color separator, a light deflector, a projector lens assembly and apertures having a shape similar to an image of the light source formed near the pupil of the projector lens assembly.

2 Claims, 22 Drawing Sheets

LIQUID CRYSTAL DISPLAY DEVICE AND LIQUID CRYSTAL PROJECTION DISPLAY DEVICE HAVING A LIGHT DIRECTIVITY CONTROLLER OF LIGHT BEAMS

This is a Divisional of U.S. patent application Ser. No. 08/426,837, filed Apr. 24, 1995 now U.S. Pat. No. 5,760,849.

BACKGROUND OF THE INVENTION

1. Field of the Invention

The present invention relates to a liquid crystal display device and a liquid crystal projection display device employing a liquid crystal panel for forming optical images as a result of a variation in scattering efficiency.

2. Description of the Prior Art

The research and development of display devices employing liquid crystals has flourished because this technology enables the displays to be more compact and lighter than the conventional display devices using CRT. In recent years liquid crystal display devices have been commercialized using the twisted nematic mode, in which the optical rotary power is modulated by the electric field. These devices are extensively applied to computer monitors, pocket TVs, viewfinders on video cameras, etc.

Liquid crystal projection display devices have also been developed, in which an image on a liquid crystal panel is enlarged and projected with a projection lens onto a large screen. These devices are used for home theaters and other purposes such as presentation.

FIG. 28 shows a perspective view of the major elements of a conventional liquid crystal display device. The light source comprises a fluorescent lamp placed in a fluorescent lamp box 286 and a diffusion plate 287 placed in front of the box. Diffusion plate 287 diffuses the light emitted from fluorescent lamp box 286 to become a plane light source of uniform brightness.

Liquid crystal display device 289 comprises a TN liquid crystal panel that is sandwiched by polarizers 288a and 288b. Polarizer 288a, positioned between diffusion plate 287 and TN liquid crystal panel 289, linearly polarizes the light beams from the plane light source. Polarizer 288b (referred to as an analyzer hereafter), positioned between TN liquid crystal panel 289 and a viewer of the display device, blocks the light beams from TN liquid crystal panel 289 according to the degree of modulation that the light beams experience through TN liquid crystal panel 289. Typically polarizer 288a and analyzer 288b are arranged so that their polarization directions are perpendicular to each other.

To summarize, first, a plane light source is created; the light beams from the plane light source are linearly polarized by polarizer 288a; a TN liquid crystal panel modulates the linearly polarized light beams according to image signals that are applied to the panel; analyzer 288b blocks or passes the light beams according to the degree of modulation, and thus, images are formed on the panel.

Recently, liquid crystal panels are becoming larger with diagonal lengths of over 10 inches, and, accordingly, a suitable back lighting method is needed. It is difficult to illuminate the whole display area uniformly without increasing the thickness of the display device. To solve this problem edge lighting is being used in which, as shown in the cross sectional view of FIG. 29, light is introduced into a light guide 291 from fluorescent lamps 292 placed on both sides. This scheme allows the back light to be as thin as the diameter of the fluorescent lamps. Brightness and uniformity can be improved by adding a diffusion plate, a prism sheet and the like to the light guide.

The conventional viewfinder is described below. An example of a conventional viewfinder is shown in Japanese Patent Laid-Open Publication SHO 62-111233. In the present specification the viewfinder comprises at least an image display device and a light source such as a light emitting diode, both integrated into one.

FIG. 30 is a cross sectional view of a conventional viewfinder. In the figures reference numeral 31 is a body; 32, an ocular cover; 300, an ocular ring; 309, a TN liquid crystal display device. Body 31 encloses a liquid crystal display device and a back light as a light source. Body 31 and ocular ring 300 contain lenses 301 and 302, which, in combination, function as magnifying lenses. Focusing can be changed to suit the viewer's vision by adjusting the depth of insertion of ocular ring 300. TN liquid crystal display device 309 has a liquid crystal layer of approximately 5 $\mu$m in thickness and color filters arranged in mosaic structure. Further, polarizer 308a and analyzer 308b sandwich the TN liquid crystal display device. The viewfinder is mounted on the main body of the video camera with fixture 33.

The principle of the operation is the same as that of the TN liquid crystal display device described above. In the case of the viewfinder, however, displayed images are magnified with lenses 301 and 302.

The conventional liquid crystal projection display device is described below. FIG. 31 shows a schematic view of the conventional liquid crystal projection display device. The liquid crystal projection display devices currently available on the market use a TN liquid crystal panel as described above. The TN liquid crystal panel requires a polarizer on each of the entrance and exit sides to modulate the light intensity. Therefore, it inherently has a low light utilization efficiency.

One method to control the light intensity without polarizers uses light scattering. The polymer-dispersed liquid crystal panel in particular is being studied intensively as shown in U.S. Pat. No. 4,435,047 in the expectation of improving its brightness.

FIG. 31 shows a liquid crystal projection display device which has three liquid crystal panels each modulating only one of the RGB lights. There is however, a single-panel liquid crystal projection display device, in which all pixels have one of RGB filters and modulate only the light intensity of the respective color. The single-panel liquid crystal projection display device can be compact and light in weight because it does not need the optics for color separation and mixture that are necessary to the three-panel liquid crystal projection display device. Although the device does not require adjustment of RGB convergence, the poor characteristic of the color filters gives rise to a low color purity for projected images.

U.S. Pat. No. 5,161,042 demonstrates one method for correcting this problem: the white light emitted by a light source is separated into RGB lights, each of which is focused onto individual pixels with microlenses.

A video camera must be light and compact for portability and ease of operability. For this reason liquid crystal display devices are being introduced as viewfinders. The power consumption of the current viewfinders is relatively high because they use a TN liquid crystal display device. For example, there is a viewfinder using a TN liquid crystal display device which consumes 0.1 W for a TN liquid crystal panel and 1.0 W for a light source, that is, 1.1 W in total. The necessity of a video camera to be light and compact imposes a limit on the size of battery it can carry. When a viewfinder uses a large amount of power, its time of continuous operation time becomes correspondingly short.

The same problem exists for a portable laptop computer monitor.

The following factor contributes to the large power consumption of the TN liquid crystal display device. As mentioned above the TN liquid crystal display device needs two polarizers, one placed on the entrance side and the other on the exit side, and the total transmittance is low, approximately 30%. To obtain a necessary brightness, therefore, a large light source is required, which results in a high power consumption.

For a liquid crystal panel, the present invention employs a polymer-dispersed liquid crystal panel that forms optical images as a result of a variation in scattering efficiency. It can provide a bright display device because the absence of polarizers gives rise to a high light utilization efficiency. That is, the light source consumes less power. In a device with a polymer-dispersed liquid crystal panel a higher contrast ratio is obtained when the light beams from a light source have a higher directionality. In a polymer-dispersed liquid crystal panel, a change in the voltage applied to a pixel induces a change in the light scattering of the pixel. When no voltage is applied, the light beams are scattered the most, and as the applied voltage is increased, light scattering decreases. The light beam of a high directionality projected on the liquid crystal panel is modulated in intensity due to light scattering, and a viewer of the panel sees the modulation in light intensity from the pixel. Thus, the viewer sees the change in brightness of the pixel. This is a principle of the display device. It is difficult, however, to illuminate the entire panel uniformly with the light beams of a high directionality. Typically, a long distance is needed between the light source and the liquid crystal panel in order to illuminate the entire panel uniformly. Also, for a larger panel a longer distance is necessary, which result in a larger display device. This eliminates the feature of thinness in the liquid crystal panel. If diffused light is used, on the other hand, the light passing through the polymer-dispersed liquid crystal panel in the transparent state is still diffused light. This situation is much the same as when the polymer-dispersed liquid crystal panel is in the scattering state and it results in a low contrast ratio.

The liquid crystal projection display device employing a polymer-dispersed liquid crystal panel typically uses apertures to pass light beams close to the axis of directionality. This is based on the fact that the light beams exiting from the liquid crystal panel with a limited solid angle vary their intensities more in the light scattering state. That is, a higher contrast ratio is obtained only by improving the light scattering characteristics of the liquid crystal panel or by using a light source of high directionality with proper projection optics having a small collection angle.

In particular, a single-panel liquid crystal projection display device employing a polymer-dispersed liquid crystal panel as a light valve, as shown in U.S. Pat. No. 5,161,042, needs a projection lens having a large collection angle to collect the RGB light beams passing through each pixel.

SUMMARY OF THE INVENTION

An object of the present invention is to provide a compact, lightweight, high contrast, low power consumption liquid crystal display device and liquid crystal projection display device. The liquid crystal display device comprises a light generation means such as a fluorescent tube, cathode ray tube, and LED, a means for diffusing the emitted light beams from the light generation means, and a liquid crystal panel such as a polymer-dispersed liquid crystal panel for forming an image as a result of a variation in scattering efficiency, the light beams diffusing means and the liquid crystal panel being separately positioned with a distance between them.

The liquid crystal display device may comprise a means for controlling a light beam directionality placed between the light generation means and the liquid crystal panel for forming an image as a result of a variation in scattering efficiency. Further the means for controlling the light beam directionality is allowed to move between the light generation means and the liquid crystal panel and change its distance with respect to them. The means for controlling the light beam directionality may be a louver that has openings separated by a plurality of walls from each other or an assemblage of a plurality of optical fibers. The light beam directionality can be varied by changing the dimensions of the apertures and the thickness of the louver. The walls of the louver and the optical fibers are made to absorb light beams.

The means for controlling the light beam directionality may be a light beam bending means such as a prism, a lenticular lens, a microlens and the like. In these cases the prisms and lenticular lenses must be arranged in the device so that the apexes of the prisms and the sides of the cylinders face the liquid crystal panel. The means may be an assemblage of microlenses. Each microlens has an aperture on the bottom and the rest of the area is shielded from light. The assemblage is arranged in the device so that the apertures face the light generation means.

If one adds to the aforementioned system a means for magnifying the image on the liquid crystal panel thereby allowing a viewer to see the image, it becomes a viewfinder.

The liquid crystal projection display device of the present invention comprises a light generation means, a color-separation means for separating the colors of the emitted light beams from the light generation means, a light bending means for controlling the direction of the light beams emitted from the light generation means, a liquid crystal panel for forming an image as a result of a variation in scattering efficiency, a projection means for projecting the image onto the liquid crystal panel, and apertures, the shapes of which are similar to the images of the light source formed near the pupils of the projection means.

There is also a color filtering means at each of the apertures for transmitting only the color of the image of the light source.

The light beam bending means may be prisms, lenticular lenses, microlenses and the like as mentioned above.

The operation of a polymer-dispersed liquid crystal is described briefly with reference to FIGS. 26A and 26B. The figure shows the "off" state 26A and "on" state 26B of the polymer-dispersed liquid crystal. Reference numeral 262 is an array substrate on which TFTs are formed; 264 pixel electrodes; 261 opposing electrodes; 265 a droplet liquid crystal; 266 a polymer; 263 an opposing electrode substrate. The TFTs (not shown), etc. are connected to pixel electrodes 264. The applied voltage to the pixel electrodes varies according to the on and off states of the TFTs, the orientation of the liquid crystals changes accordingly, and, thus, the light intensity is modulated. In the absence of the applied voltage as shown in FIG. 26A, droplet liquid crystals 265 orient themselves in random directions. The difference in index of refraction between droplet liquid crystals 265 and polymer 266 causes the incident light beams to be scattered.

In the presence of the applied voltage, as shown in FIG. 26B, droplet liquid crystals 265 orient themselves in the same direction. If the index of refraction of the liquid crystals along that direction has been adjusted to be the same as that of the polymer, the incident light is not scattered and exits from array substrate 262.

In order to observe the image on the polymer-dispersed liquid crystal panel which is formed as a result of a variation in scattering efficiency, only the light beams from the panel going within a certain solid angle are collected.

The eye of the viewer is almost fixed at ocular cover 32 of the viewfinder. Since the display screen is small, a large viewing angle is not required even without an ocular ring. When fluorescent lamp back lighting is employed, light beams within a small solid angle from the area of about the same size as the liquid crystal panel are utilized; the light beams going outside of the solid angle are not.

In the present invention the light source and the liquid crystal panel are positioned separately with a distance between them, which allows the diffused light beams from the light source to enter the liquid crystal panel with limited angles of incidence, giving rise to a certain light beam directionality and hence a high contrast ratio for the image. The angle of the directionality is determined by the size of the liquid crystal panel and the separation between the light source and the liquid crystal panel. A high contrast ratio is obtained with a large separation between them, which adversely leads to a deep liquid crystal display device.

For overcoming these drawbacks, in the present invention, a means for controlling the light beam directionality is placed between the light source and liquid crystal panel, which allows the light beams incident to the liquid crystal panel to have an improved light beam directionality to produce a liquid crystal display device with a high contrast ratio.

The operation of the liquid crystal projection display device of the present invention is described below. White light from the light source is color-separated into the three colors, RGB, each of which is then directed toward the liquid crystal panel. The light beam bending means placed between the light source and the liquid crystal panel allows each of the RGB beams, having different angles of incidence, to pass the pixels for its own color. The RGB light beams transmitted through the liquid crystal panel are focused near the pupils of the projection lens to make the light source images. Apertures having a shape similar to the image of the light source are placed in the projection lens. In this case, however, light beams scattered by the liquid crystal panel go through all the apertures, reach the screen, and degrade the contrast ratio. For example, when an R beam is incident on a pixel of the liquid crystal panel and is scattered there, the scattered light beams go through not only the aperture for transmitting the light source image of the R beams but also the apertures for the G and B beams. To avoid this problem, one can place a color filtering means for one color at each aperture associated with the light source image for that color so that only the light beam of that color can go through the aperture. Thus, the scattered light beams of different colors are blocked and the contrast ratio improves.

In a liquid crystal display device using a liquid crystal panel that forms an image as a result of a variation in scattering efficiency, according to the present invention, a diffused back lighting, which is bright and uniform over the area of the size of the liquid crystal panel, makes the liquid crystal display device of a high contrast. A means for controlling the light beam directionality placed between the light source and liquid crystal panel, such as a louver or prism plate, reduces the length of the liquid crystal display device. One can make a viewfinder by adding magnifying lenses to the above system.

According to the present invention, the liquid crystal projection display device using a liquid crystal panel that forms an image as a result of a variation in scattering efficiency is compact and lightweight, and produces bright images of a high contrast ratio.

BRIEF DESCRIPTION OF THE DRAWINGS

The present invention will become more fully understood from the detailed description given below and the accompanying drawings wherein.

DESCRIPTION OF THE PREFERABLE EMBODIMENTS

Figure 1:
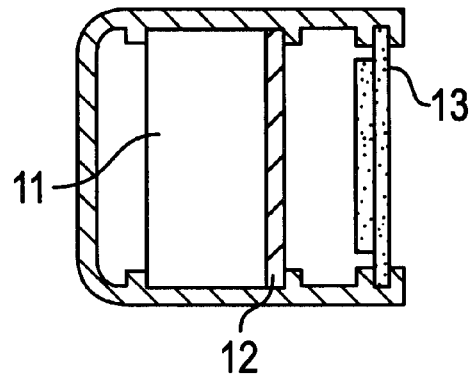
FIG. 1 shows a cross section of the liquid crystal display device of the first embodiment of the present invention.

Preferable embodiments of the present invention are described below with accompanying drawings. FIG. 1 shows a cross sectional view of an inner structure of the first embodiment of the liquid crystal display device of the present invention. In the figure, reference numeral 11 is a light source; 12, a diffusing plate; 13, a polymer-dispersed liquid crystal panel (referred to as a liquid crystal panel hereafter).

Liquid crystal panel 13, using a polymer-dispersed liquid crystal panel, provides a display of high brightness. The conventional TN liquid crystal panel must use a polarizer and analyzer that reduce the optical transmittance to approximately 30%, while the polymer-dispersed liquid crystal panel provides brightness three times as high as the TN liquid crystal panel because it does not use polarizers.

The polymer-dispersed liquid crystal panel does not have the function of an optical shutter as the TN liquid crystal panel does, but simply deflects the incident light beams. When the applied voltage to a pixel of the polymer-dispersed liquid crystal panel changes, the scattering property of the pixel changes. When no voltage is applied, the light beams are scattered the most and as the applied voltage is increased, light scattering decreases. The light beams incident on liquid crystal panel 13 are modulated in intensity because of light scattering, and a viewer of the panel sees the modulation in light intensity from the pixel. Thus, the viewer sees the change in brightness of the pixel. Therefore, the contrast ratio increases as the directionality of the incident light beams on liquid crystal panel 13 increases and the angle to collect the exiting light beams from the liquid crystal panel decreases.

Light source 11 comprises a light emitting device and a reflector. A fluorescent lamp is used for the light emitting device and a reflector placed behind it improves the light utilization efficiency. Diffusion plate 12 is placed in front of light source 11 to obtain uniform brightness on the panel. If diffused light is incident on a polymer-dispersed liquid crystal panel, the exiting light is always diffused light regardless of the state of the panel, scattering or transmitting. Hence, a poor contrast ratio results. Therefore, in the present invention diffusion plate 12 and liquid crystal panel 13 are placed with large separation between them, which improves the light beam directionality because the angles of the incident light beams onto the liquid crystal panel are limited. More specifically, if the diagonal of the display area of liquid crystal panel 13 is 17 mm and the separation between the panel and diffusion plate 12 is 10 mm, the incident light beams in the central region of panel 13 have a half angle of 40°. The incident light beams are scattered on liquid crystal panel 13 in all directions. Therefore, the light intensity per unit solid angle reduces, and a high contrast ratio is obtained.

As the separation between diffusion plate 12 and liquid crystal panel 13 increases, the angle of the incident light beams decreases, and the contrast ratio improves at the expense of the compactness of the device. To illuminate the perimeter of liquid crystal panel 13, the size of light source 11 must be larger than the display area of liquid crystal panel 13. Therefore, a larger light source is required when the separation between diffusion plate 12 and liquid crystal panel 13 increases.

A brief description is given below on polymer-dispersed liquid crystals. There are two types of polymer-dispersed liquid crystals depending on how the polymers and liquid crystals are dispersed. In one type, droplet liquid crystals are dispersed in the polymers. The liquid crystals are separated with the polymers. The liquid crystals of this type are referred to as PDLC, and a liquid crystal panel made of PDLC is referred to as a PD liquid crystal panel. In another type, liquid crystal is dispersed continuously in polymer. This type of liquid crystal is called PNLC. Images are formed on both types of liquid crystal panels by controlling the light transmission and scattering of the panels.

PDLC is based on the property that its index of refraction depends on the direction of the orientation of the liquid crystal. In the absence of the applied electric field the orientation of the liquid crystal is random. The incident light beams are scattered due to the difference in index of refraction between the liquid crystals and the polymers. In the presence of the applied electric field the orientations of different liquid crystals are directed in one direction. If the index of refraction of the liquid crystals along this common direction is the same as that of the polymer, the incident light beams are not scattered.

On the other hand, PNLC, is based on the randomness of the orientations of the liquid crystal molecules. In a random orientation, that occurs in the absence of the applied electric field, the incident light beams are scattered. In the presence of the applied electric field, however, the orientation is ordered and the light beams are not scattered. A liquid crystal panel made of PNLC is referred to as a PN liquid crystal panel.

Although the present invention can use either PD liquid crystal panel or PN liquid crystal panel, the PD liquid crystal panel has been chosen as an example to facilitate an explanation of the present invention. PDLC and PNLC are generally referred to as polymer-dispersed liquid crystals, and PD and PN liquid crystal panels are generally referred to as polymer-dispersed liquid crystal panels. Also, the droplet liquid crystal dispersed in the polymer-dispersed liquid crystal layer is referred to as the droplet liquid crystal. The resin component surrounding the droplet liquid crystal is referred to as the polymer.

Liquid crystal materials in use for the polymer-dispersed liquid crystal panel in the liquid crystal display device of the present invention are preferably nematic, smectic, or cholesteric liquid crystals; the materials may be a mixture of one or more liquid crystal compounds with one or more materials different from the liquid crystal compounds. Among the aforementioned materials nematic liquid crystal of cyanobiphenyl are the most preferable because they have considerably different ordinary and extraordinary indexes of refraction, $n_o$ and $n_e$, respectively. Transparent polymers are preferable for polymer matrix materials. The polymer may be either a thermoplastic resin or photocuring resin. A UV curing resin may be preferable because it separates easily from liquid crystal layers and makes manufacturing processes simpler. For example, UV curing acrylic resins include an acrylic oligomer or an acrylic monomer that polymerizes under UV irradiation.

The monomers that form polymers are: 2-ethyl hexyl acrylate, 2-hydroxy ethyl acrylate, neo pentil glycol acrylate, hexane diol diacrylate, diethylene glycol diacrylate, tripropylene glycol diacrylate, polyethylene glycol diacrylate, trimethylol propane triacrylate, penta erythritol acrylate, and so on.

Examples of olygomers or prepolymers are polyester acrylate, epoxy acrylate, polyurethane acrylate, and so on.

One may use a polymerization initiator to accelerate polymerization. The examples are 2-hydroxy-2-methyl-1-phenylpropane-1-on (Merck "DALOCURE 1173"), 1-(4-isopropylphenyl)-2-hydroxy-2-methylpropane-1-on (Merk "DALOCURE 1116"), 1-hydroxycyclohexylphenylketon ((Ciba Geigy "ILGACURE 651") and so on. One may add a chain transfer agent, photosensitization agent, dye, or bridge formation agent according to circumstances.

The content of the liquid crystal materials in the polymer-dispersed liquid crystal is not particularly specified. It is, generally, 20% to 95% in weight, with the preferable content being 50% to 85% in weight. When the content is below 20% in weight, the quantity of droplet liquid crystals is too small for the light beams to be scattered efficiently. When the content is higher than 90% in weight, the polymer and the liquid crystal tend to separate into two different layers. Accordingly, the area of the interface between the liquid crystal and the polymer becomes small and, hence, the efficiency of light scattering decreases. The structure of the polymer-dispersed liquid crystal layer depends on the content of the liquid crystal: if it is below 50% in weight, the liquid crystal forms independent drops, while, when the content is higher than 50% in weight, the liquid crystal and the polymer form intricate layers.

The preferable thickness of the layer of liquid crystal 15 is between 5 and 30 $\mu$m, more particularly, between 10 and 15 $\mu$m. On one hand, if the thickness is too small, the scattering characteristic is poor resulting in a low contrast ratio. On the other hand, too large a thickness requires a high-voltage operation and creates difficulty in designing an IC to drive the liquid crystal. Also, the drive IC consumes much power.

In order to obtain a sufficient contrast ratio the average diameter of droplet liquid crystals must be between 0.5 $\mu$m and 2.0 $\mu$m. Otherwise the scattering characteristic is poor. More specifically, the preferable diameter of the liquid crystals is between 0.8 $\mu$m and 1.5 $\mu$m. In the case of PNLC, the diameters of voids of polymers correspond to the diameters of the liquid crystals mentioned above, that is, the diameters of the voids of the polymer network.

In this embodiment a polymer-dispersed liquid crystal panel is used. This, however, is not the only kind that can be used for the panel. For example, for a light modulation device of this invention one could use a liquid crystal panel operated in the dynamical scattering mode (DSM), a ferroelectric liquid crystal panel in the scattering mode, a PLZT display panel, and the like, which can induce modulation of light scattering or transmission.

The following light emitting devices can be used for a light source: a cathode ray tube, a gas-discharge tube operated in the same way as a vacuum fluorescent lamp, a fluorescence emitting device, a xenon lamp, a halogen lamp, an incandescent lamp, a metal halide lamp, a LED, an electroluminescence (EL), and a plasma display panel (PDP) that emits light by discharge. Although one may use any of these light emitting devices as a light source, the most suitable light sources are a cathode-ray tube, a gas-discharge tube, a LED, and a fluorescence emitting device because they are bright and compact, consume low power, and emit white light. If the light source is a planar light source, which provides a uniform brightness on the entire display area of the liquid crystal panel, diffusion plate 12 is not necessary.

Figure 2:
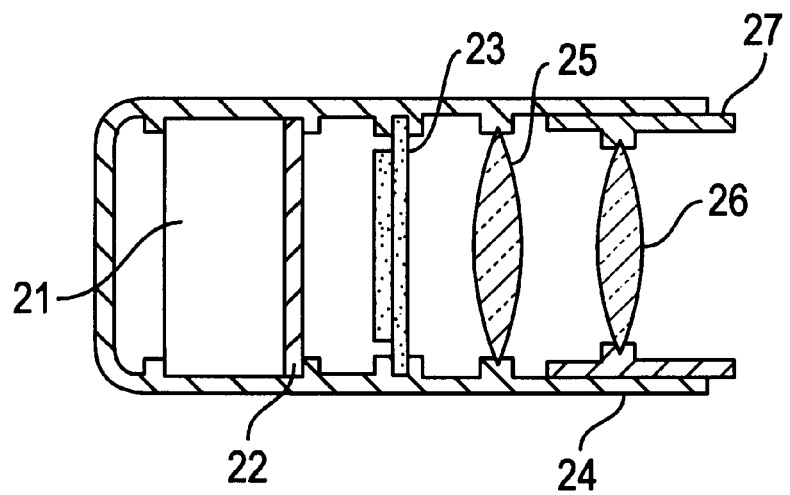
FIG. 2 shows a cross section of the liquid crystal display device of the second embodiment of the present invention.
Figure 3:
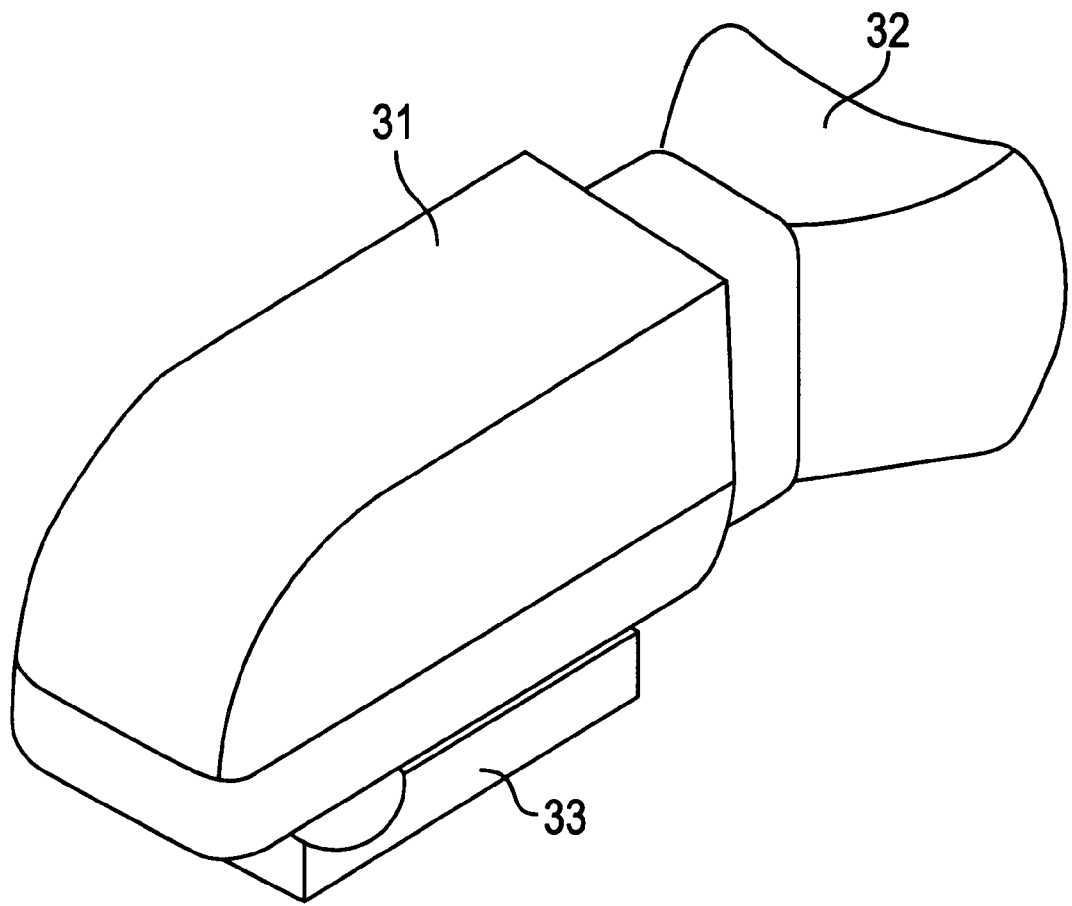
FIG. 3 is an outside drawing of the viewfinder.

FIG. 2 shows a cross sectional view of the second embodiment of the liquid crystal display device of the present invention. The second embodiment further comprises magnifying lenses 25 and 26 in addition to the liquid crystal display device shown in FIG. 1 and is applied to a viewfinder. If the magnifying lenses are removed, the embodiment would be exactly the same as the first embodiment. FIG. 3 shows the viewfinder of the present invention. An ocular ring 27 is attached to the end of body 31. Both magnifying lenses 25 and 26 are mounted on ocular ring 27. The inside of the body is painted with black or a dark color for absorbing stray light. The light beams emitted from a light emitting device in light source 21 are scattered by scattering plate 22, which, in turn, becomes a planar light source with uniform brightness. The diffused light beams are incident on the liquid crystal panel 23 from the side that has opposite electrodes (not shown). The liquid crystal panel 23 is a polymer-dispersed liquid crystal panel. Polymer-dispersed liquid crystal panel 23 changes in light transmittance or scattering efficiency depending on image signals and forms images accordingly. If diffusion plate 22 and liquid crystal panel 23 are positioned apart with a large separation, the angle of incidence on the liquid crystal panel is small, and, hence, the contrast ratio of liquid crystal panel 23 becomes high. A viewer would see images on liquid crystal panel 23 with his eye closely placed on ocular ring 27 or ocular cover 32. A combination of two lenses 25 and 26 functions as a magnifying lens and allows the viewer to see magnified images on small liquid crystal panel 23. The magnified images the viewer sees are virtual images.

Ocular cover 32 almost fixes the position of the eye, and the light source behind it can have a sharp light beam directionality. If the directionality is too sharp, however, a slight movement of the eye position makes the display image of the viewfinder considerably darker to the viewer. The viewfinder utilizes only the light beams directed in a small solid angle exiting from the display area of the liquid crystal panel. Since the light beams directed away from the small solid angle are not utilized, the light utilization efficiency is considerably low. An attempt to magnify a point light source using lenses in order to increase the light utilization efficiency would not be successful because a long light path would be needed, and the viewfinder would be too long.

Liquid crystal panel 23 has color filters formed in mosaic pattern (not shown). The pixels are arranged in delta configuration. The panel has 96,000 pixels. The color filters transmit one of the red, green, or blue lights. The thickness of the color filters for each color can be controlled by changing the materials for each color. The thickness of each of the color filter layers is determined when the filters are made. That is, the thicknesses of the color filter layers can vary from one color to the other. Accordingly, the thickness of the liquid crystal associated with a different color can be adjusted by varying the thicknesses of the color filter layer. A polymer-dispersed liquid crystal panel has a lower scattering efficiency in longer wavelengths (red) than in shorter ones. The thicker liquid crystal layer for red pixels improves the scattering characteristics for the red pixels and gives rise to a similar range of the gray scale for all colors.

Figure 27:
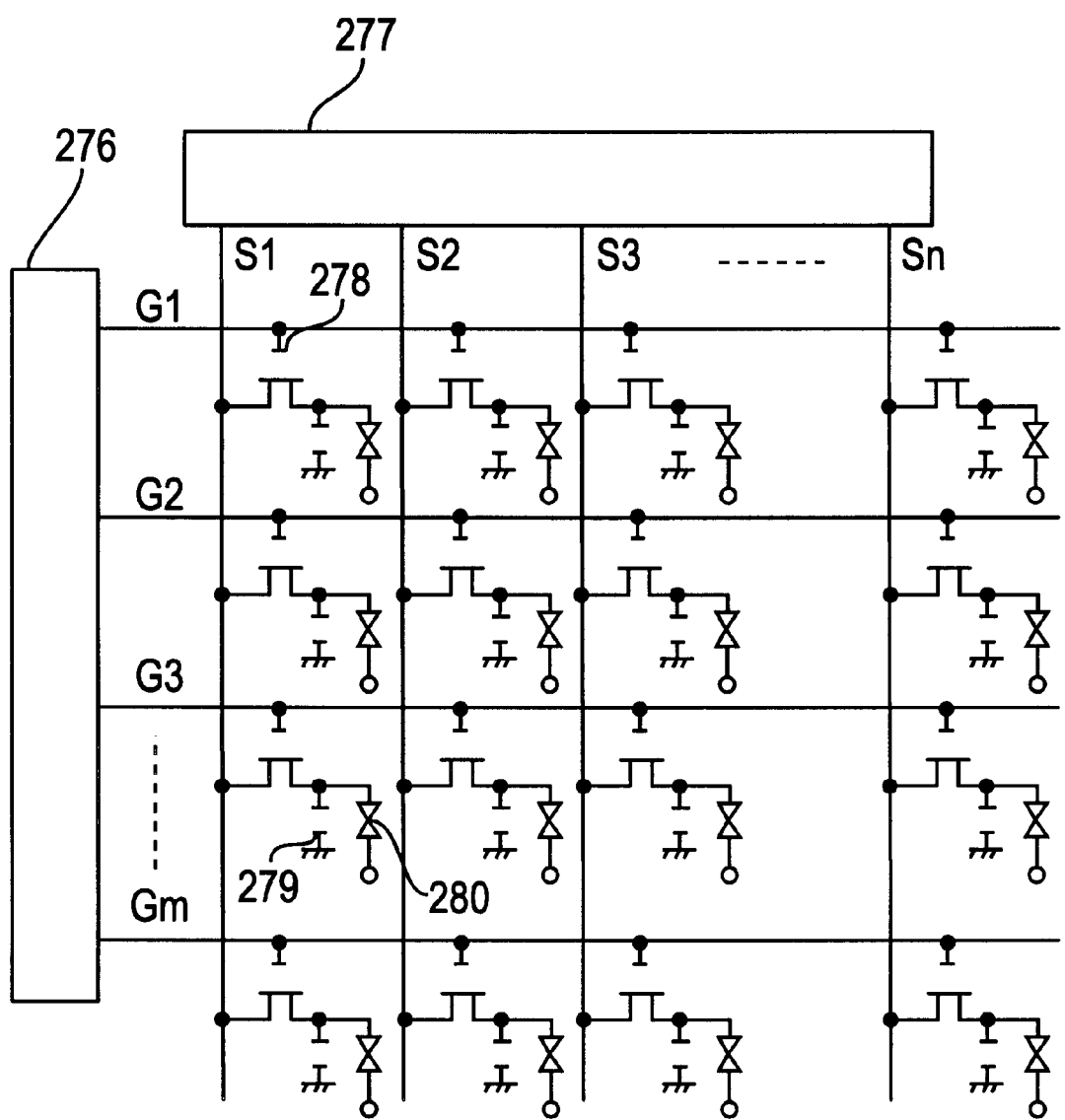
FIG. 27 shows an equivalent circuit of an active matrix liquid crystal panel.
Figure 28:
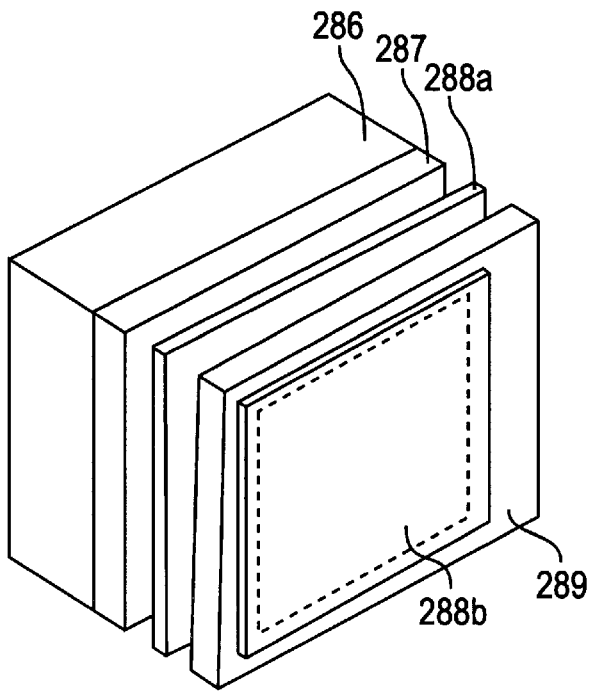
FIG. 28 shows a perspective view of the major components of a conventional viewfinder.

Described below is a drive circuit unit for the liquid crystal panel in use for the viewfinder of the present invention. To obtain a high contrast display an active matrix liquid crystal panel is used for the viewfinder of this invention. FIG. 27 shows a diagram of an equivalent circuit for an active matrix liquid crystal panel. In the figure G1–Gm denote gate signal lines, one end of each being connected to a gate drive IC 276 that works as a switching device. Gate drive IC 276 provides the thin film transistor (referred to as a TFT hereafter) with a voltage to activate the transistor (referred to as an on voltage hereafter) as well as a voltage to deactivate it (referred to as an off voltage hereafter). S1–Sn denote source signal lines, one end of each being connected to a source driver IC 277. A TFT 278 is connected to a pixel electrode. A polymer-dispersed liquid crystal panel 280 is sandwiched between the pixel electrode and the opposite electrode. TFT 288 is coupled to capacitor 289 that works as a charge storage device.

Some of the light beams emitted from liquid crystal panel 23 enter the eyes of the viewer, while others become stray light which reduces the contrast ratio of the display image. To solve this problem the insides of body 31 and ocular ring 27 are painted with black or a dark color that suppresses the reflection of stray light. This prevents unnecessary light beams from entering liquid crystal panel 23 and the contrast ratio from degrading.

The viewer can adjust the focus depending on his/her vision by sliding ocular ring 27 in or out through body 31. The position of the viewer's eye is fixed by ocular cover 32 and it is kept fixed even while he/she uses the viewfinder. The stability of the eye position allows the viewer to see clear images even if liquid crystal panel 23 has a sharp light beam directionality. Primary lens 25 in FIG. 2 may be removed. Although in this case the magnification of the images changes slightly when ocular ring 27 is moved, the change is small and does not cause any practical problem. This configuration still allows the viewer to adjust the focus to suit his/her vision, and brings about a low cost, compactness, and low weight. Further, when light emitting device 21 has a small emitting area, iris 22 may be removed.

The viewfinder of the present invention is bright because a polymer-dispersed liquid crystal panel is used. Liquid crystal panel 23 has a high contrast ratio even with back lighting of a uniform, planar light source formed by light source 21 and diffusion plate 22 because the liquid crystal panel and diffusion plate 22 are placed well apart.

Figure 4:
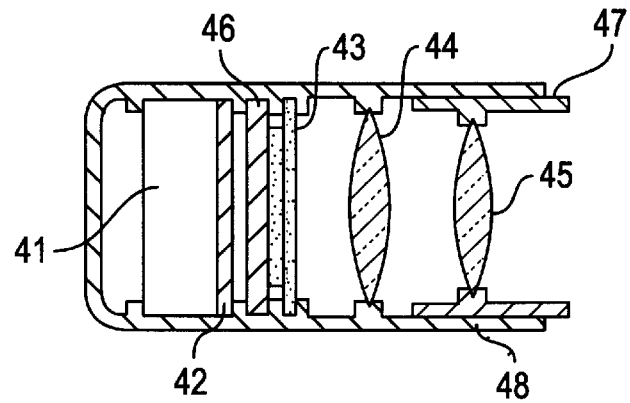
FIG. 4 shows a cross section of the liquid crystal display device of the third embodiment of the present invention.

FIG. 4 shows the third embodiment of the present invention of a liquid crystal display device. In the figure, reference numeral 41 is a light source; 42, a diffusion plate; 43, a polymer-dispersed liquid crystal panel; 44 and 45, magnifying lenses; 46, a louver.

Diffusion plate 42 functions as a uniform light source, scattering the light beams emitted from light source 41 in all directions. Louver 46 allows the scattered light beams from diffusion plate 42 to pass through it and exit going only within certain angles toward liquid crystal panel 43. Liquid crystal panel 43 forms images on it as it changes its scattering efficiency according to image signals. The image on the panel is magnified with lenses 44 and 45 and is seen by a viewer.

Figure 5:
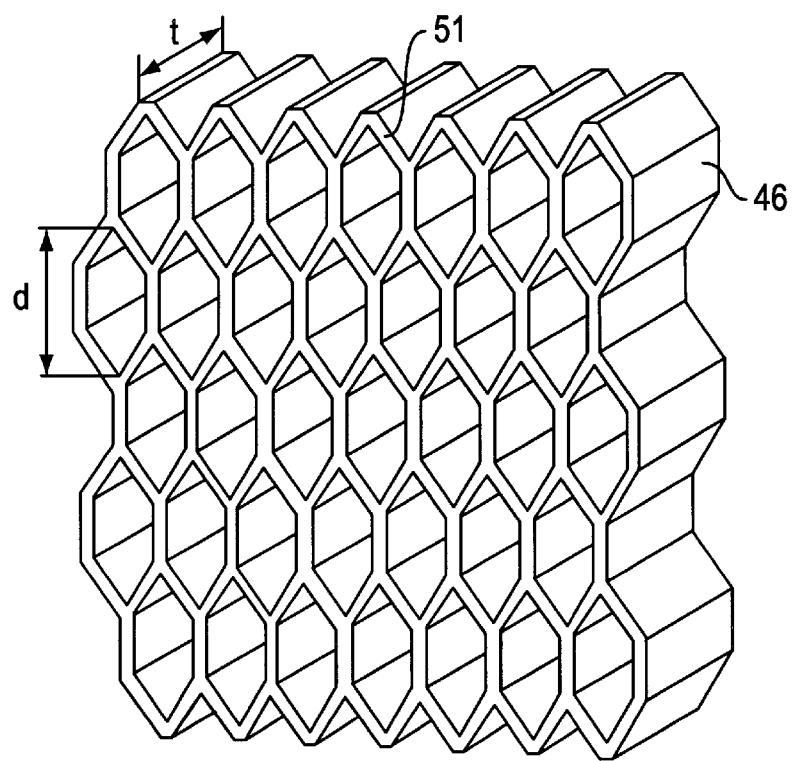
FIG. 5 shows a perspective view of the louver used for the liquid crystal display device of the present invention.

Louver 46 has a honeycomb structure as shown in FIG. 5. Hexagons are connected with each other with opaque wall 51, but the inside of the hexagon is transparent. The preferable opaque wall 51 absorbs light beams because, if it reflects the light beams, the louver cannot control the light beam directionality. If the opaque wall does not reflect the light beams, the louver transmits only the light beams going within a certain angle that is determined by the thickness t of the louver and the aperture dimension d of the hexagon and thus it can control the light beam directionality.

The preferable louver has an aperture d which is 0.2 times the thickness t or less. When the ratio is 0.2, the exiting light beams from the louver have a spread angle of 12° or less. The contrast of the panel obtained by using the whole of this angle is 50. The polymer-dispersed liquid crystal panel becomes transparent with the applied voltage of 8V and shows the maximum scattering with no applied voltage. The contrast ratio of the panel is the ratio of the brightness of the former relative to the latter.

Figure 6:
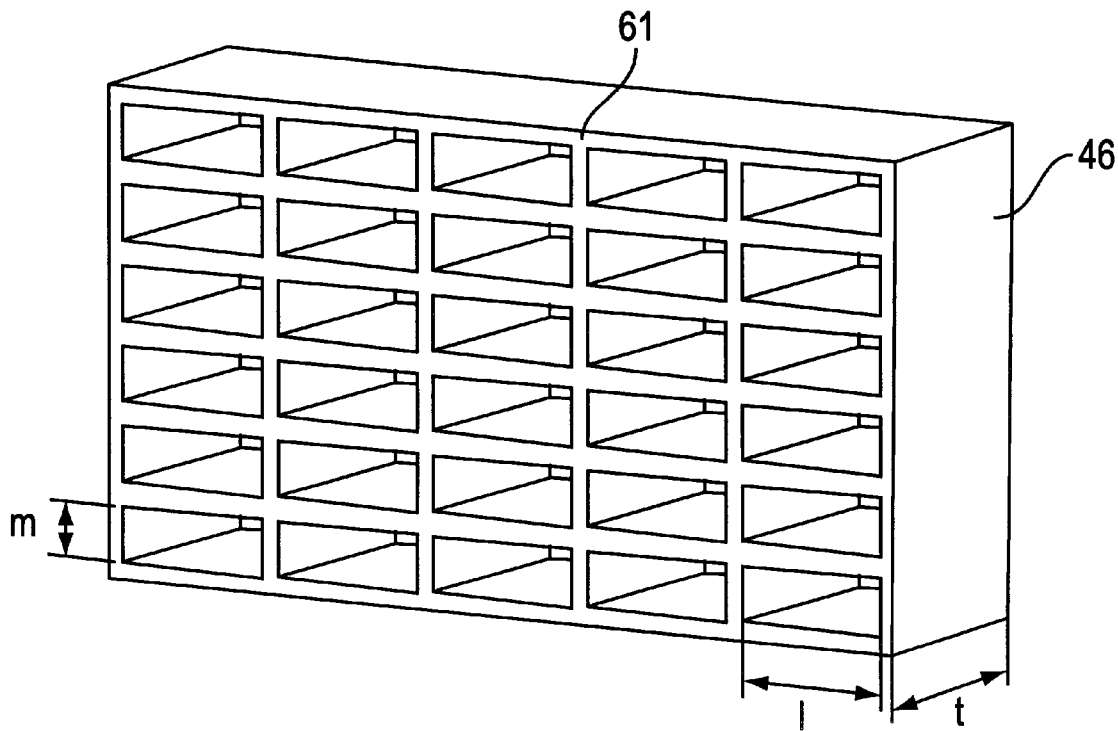
FIG. 6 shows a perspective view of the louver used for the liquid crystal display device of the present invention.

FIG. 6 shows a perspective view of another type of louver which is made of rectangular parallelpipedons. As in the case of FIG. 5, the rectangular parallelpipedons are connected with each other with opaque wall 61, but the inside of the rectangular parallelpipedon is transparent. The preferable opaque wall 61 absorbs light beams. If opaque wall 61 does not reflect the light beams, the louver shown in FIG. 6 transmits in the direction along the longer side of the rectangle only the light beams going within a spread angle determined by the thickness t of the louver and the longer side length 1 of the rectangle. In the direction along the shorter side of the rectangle only the light beams directed within a spread angle determined by the thickness t and the shorter side length m. This louver, therefore, produces an anisotropic directionality. The louver can be arranged so that the longer side of the rectangle is aligned with the direction of eye movement because a direction of less directionality gives rise to a larger viewing angle.

One can use other louvers than those shown in FIGS. 5 and 6. For example a louver that has only stripes can also provide an anisotropic directionality in which the spread angle in one direction is limited compared to that in the other direction. To obtain a uniform directionality in any direction one can use a louver formed with cylinders.

When louver 46 and liquid crystal panel 43 are placed close to each other, one sees the pattern of louver on liquid crystal panel 43 when one sees liquid crystal panel 43 through lenses 44 and 45. The periodic pattern of louver 46 may interfere with the signal lines or the matrix structure of the black masks of liquid crystal panel 43 thus creating a Moire pattern resulting in a degraded display quality.

Figure 7:
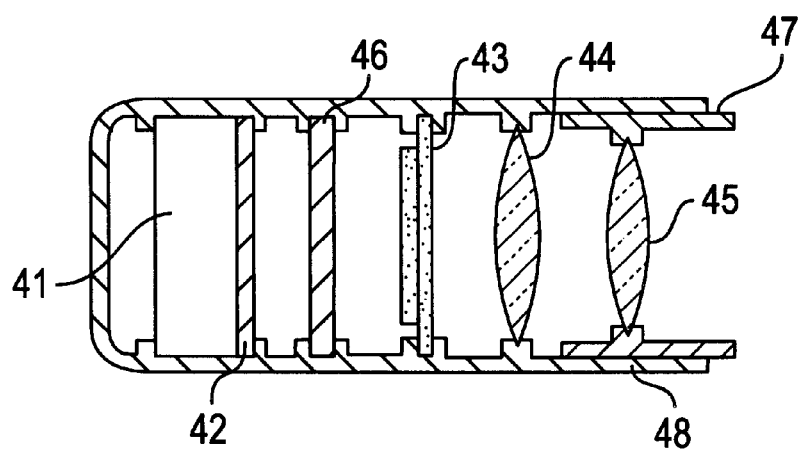
FIG. 7 shows a cross section of the liquid crystal display device of the other embodiment of the present invention.

To solve this problem another structure of the third embodiment of the present invention of a liquid crystal display device is shown in FIG. 7. In this viewfinder shown in FIG. 7 louver 46 and liquid crystal panel 43 are placed with some distance between them. With this arrangement the pattern of louver is not seen on liquid crystal panel 43, even when one sees liquid crystal panel 43 through lenses 44 and 45, and the Moire pattern is also dramatically reduced. The pitch P of the Moire pattern is expressed as Equation 1

$$1/P = n/P_d - 1/P_r$$

where $P_d$ is a pixel pitch of liquid crystal panel 43 and $P_r$ a pitch of the louver. The maximum Moire pitch becomes smallest when Equation 2

$$P_r/P_d = 2/(2n+1)$$

The modulation of the Moire pattern decreases as n increases. One can determine $P_r/P_d$ to satisfy the Equation 2.

Figure 8:
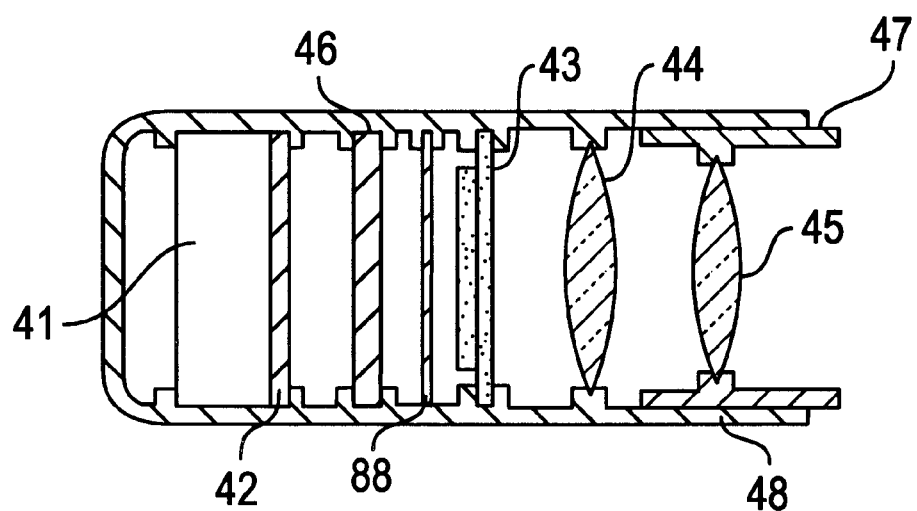
FIG. 8 shows a cross section of the liquid crystal display device of the other embodiment of the present invention.

If the louver has too fine a structure, the aperture ratio becomes small and the panel becomes dark. If the separation between louver 46 and liquid crystal panel 43 is large, the size of the viewfinder becomes too large. A moderate diffusion plate 88 placed between louver 46 and liquid crystal panel 43 as shown in FIG. 8 reduces this problem.

Figure 9:
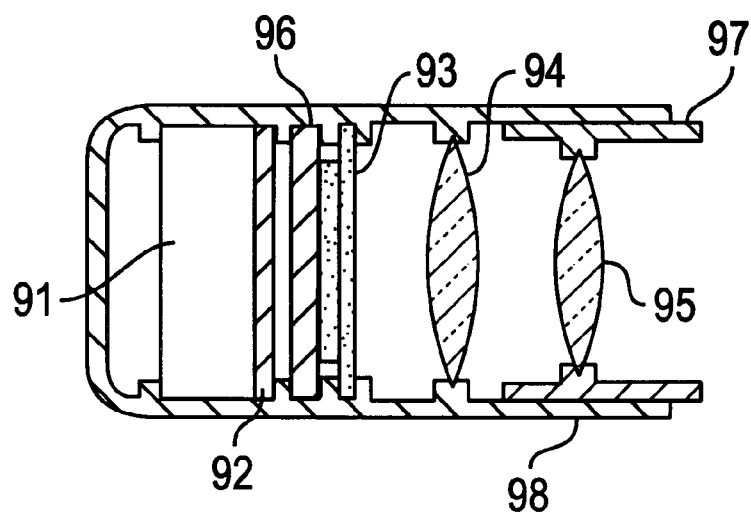
FIG. 9 shows a cross section of the liquid crystal display device of the fourth embodiment of the present invention.

FIG. 9 shows the fourth embodiment of the present invention of a liquid crystal display device. In the figure reference numeral 91 is a light source; 92, a diffusion plate; 93, a polymer-dispersed liquid crystal panel; 94 and 95, magnifying lenses; 96, a bundle of optical fibers.

Diffusion plate 92 functions as a uniform light source scattering the light beams emitted from light source 91 in all directions. The optical fibers allow the scattered light beams from diffusion plate 92 to pass through it and exit going only within certain angles toward liquid crystal panel 93. Liquid crystal panel 93 forms images on it as it changes its scattering efficiency according to image signals. The image on the panel is magnified with lenses 44 and 45 and is seen by a viewer.

Figure 10:
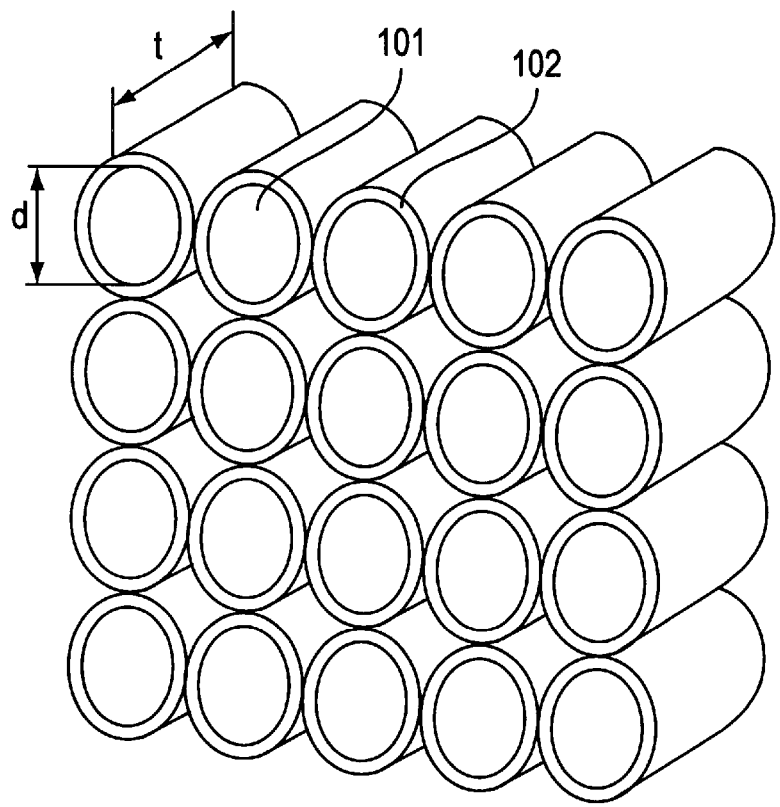
FIG. 10 shows a perspective view of the optical fibers used for the liquid crystal display device of the present invention.

A perspective view of optical fiber bundle 96 is shown in FIG. 10. It is formed with circular fibers 101 and functions in the same way as the louvers shown in FIGS. 5 and 6. The fibers are connected to each other with opaque wall 102, but the inside of the fiber is transparent. The preferable opaque wall 102 absorbs light beams, because if it reflects the light beams, fiber bundle 96 cannot control the light beam directionality. If opaque wall 102 does not reflect the light beams, fiber bundle 96 transmits only the light beams directed within an angle that is determined by the thickness t of the louver and the aperture d of the fiber, and, hence, it can control the light beam directionality.

The viewfinder shown in FIGS. 8 and 9 may be built with this fiber bundle.

Figure 11:
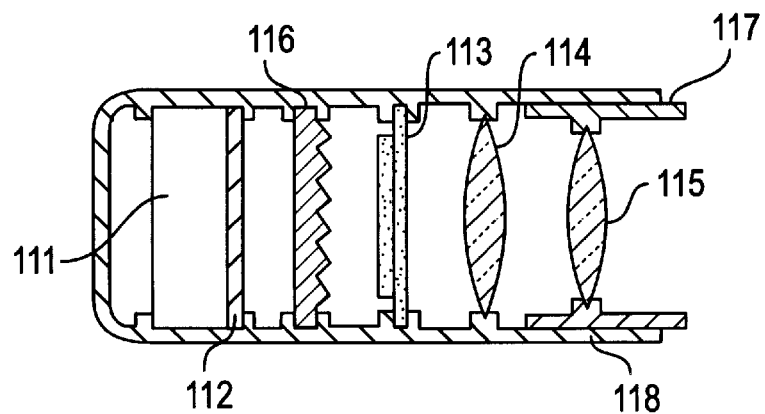
FIG. 11 shows a cross section of the liquid crystal display device of the fifth embodiment of the present invention.

FIG. 11 shows the fifth embodiment of the present invention of a liquid crystal display device. In the figure reference numeral 111 is a light source; 112, a diffusion plate; 113, a polymer-dispersed liquid crystal panel; 114 and 115, magnifying lenses; 116, a prism plate.

Diffusion plate 112 functions as a uniform light source, scattering the light beams emitted from light source 111 in all directions. Prism plate 116 allows the scattered light beams from diffusion plate 112 to pass through it and exit going only within certain angles toward liquid crystal panel 113. Liquid crystal panel 113 creates images on it as it changes its scattering efficiency according to image signals. The image on the panel is magnified with lenses 114 and 115 and is then seen by a viewer.

Figure 12:
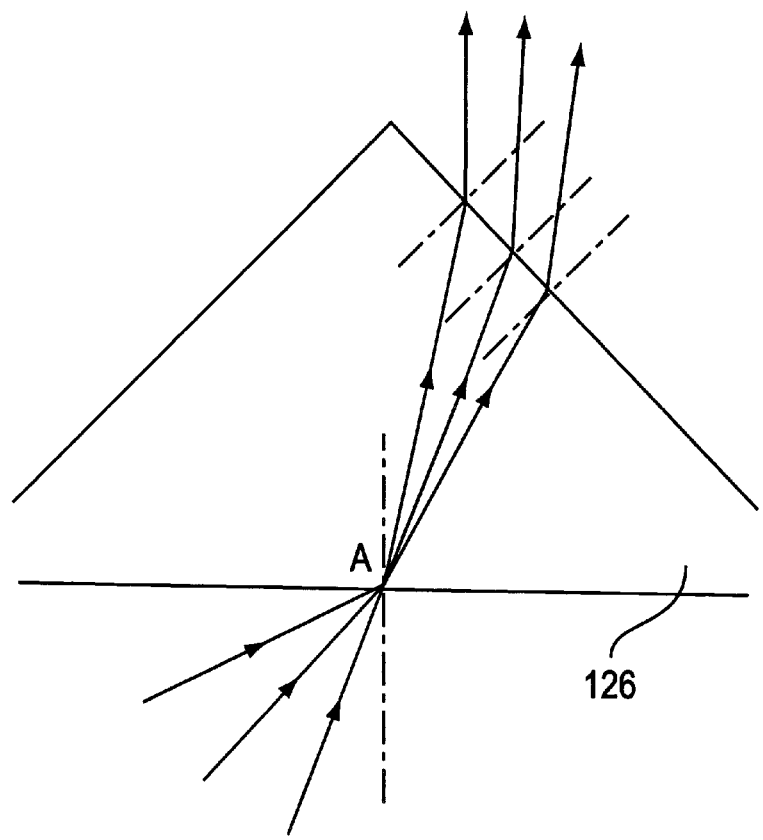
FIG. 12 illustrates the operation of the prism plate used for the liquid crystal display device of the present invention.

Prism plate 116 is arranged so that the top edges of the prisms face liquid crystal panel 113. FIG. 12 illustrates how a prism induces light beam directionality to the diffused light beams. In the figure the arrows indicate the direction along which the light beams travel. When the diffused light is incident on the base plane of prism 126, any point A on the plane receives light beams from all directions. The light beams are refracted according to Snell's law depending on the difference in index of refraction between the air and glass. Since the index of refraction of glass is larger than that of air, the angle of refraction is smaller than the angle of incidence. The refracted beams are refracted again on the side planes of the prism according to Snell's law and exit the prism. Although at this boundary the angle of refraction in the air is larger than the angle of incidence in the glass, the exiting light beams have sharper directionality when one sees them in a direction perpendicular to the base plane since the side planes of the prism are inclined with respect to the base plane. The directionality of the exiting light beams increases as the apex angle of the prism increases, that is, as the slope of the side planes increases.

Figure 13:
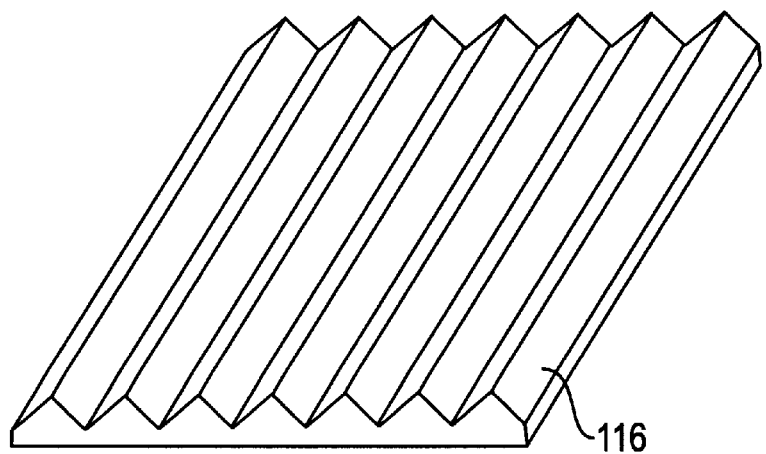
FIG. 13 shows a perspective view of the prism plate used for the liquid crystal display device of the present invention.

FIG. 13 shows a perspective view of prism plate 116 used in the present invention. The prism plate comprises prisms arranged side by side parallel to each other. Prism plate 116, shown in FIG. 13, improves the light beam directionality along the direction in which the prisms are placed but has no effect along the direction perpendicular to it. Prism plate 116 of the viewfinder of the present invention can be made rotatable so that a viewer can rotate it and set the direction of less directionality parallel to the direction of eye movement, because a low directionality gives rise to a broad viewing angle.

Figure 14:
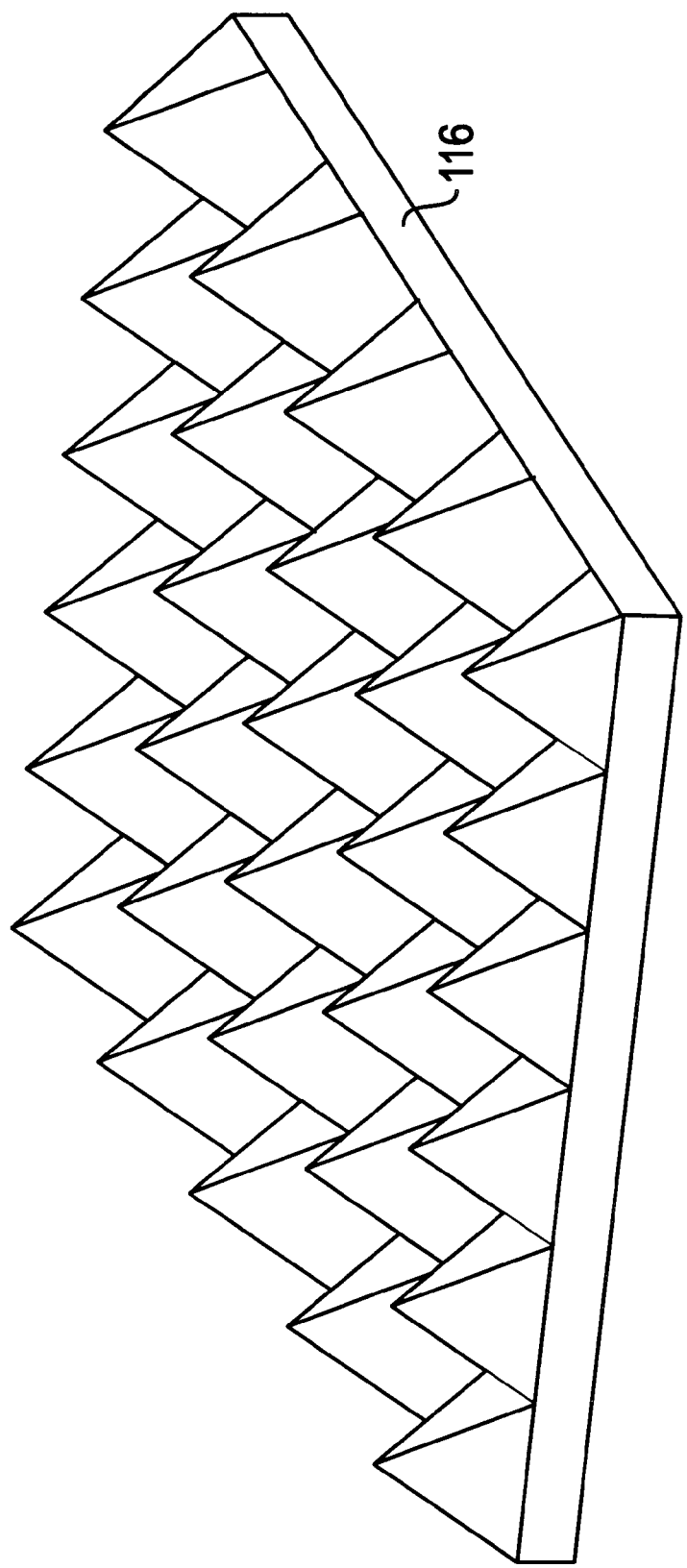
FIG. 14 shows a perspective view of the prism plate used for the liquid crystal display device of the present invention.

In order to improve light beam directionality in both directions one may use a prism plate having quadrangular pyramids arranged side by side as shown in FIG. 14.

Figure 15:
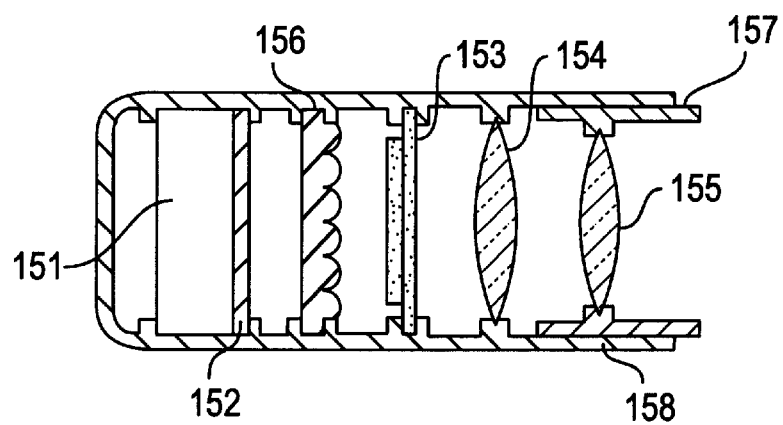
FIG. 15 shows a cross section of the liquid crystal display device of the sixth embodiment of the present invention.

FIG. 15 shows the sixth embodiment of the present invention of a liquid crystal display device. In the figure reference numeral 151 is a light source; 152, a diffusion plate; 153, a polymer-dispersed liquid crystal panel; 154 and 155, magnifying lenses; 156, a lenticular plate.

Diffusion plate 152 functions as a uniform light source, scattering the light beams emitted from light source 151 in all directions. Lenticular lens 156 allows the scattered light beams from diffusion plate 152 to pass through it and exit going only within certain angles toward liquid crystal panel 153. Liquid crystal panel 153 forms images on it as it changes its scattering efficiency according to image signals. The image on the panel is magnified with lenses 154 and 155 and is seen by a viewer.

Figure 16:
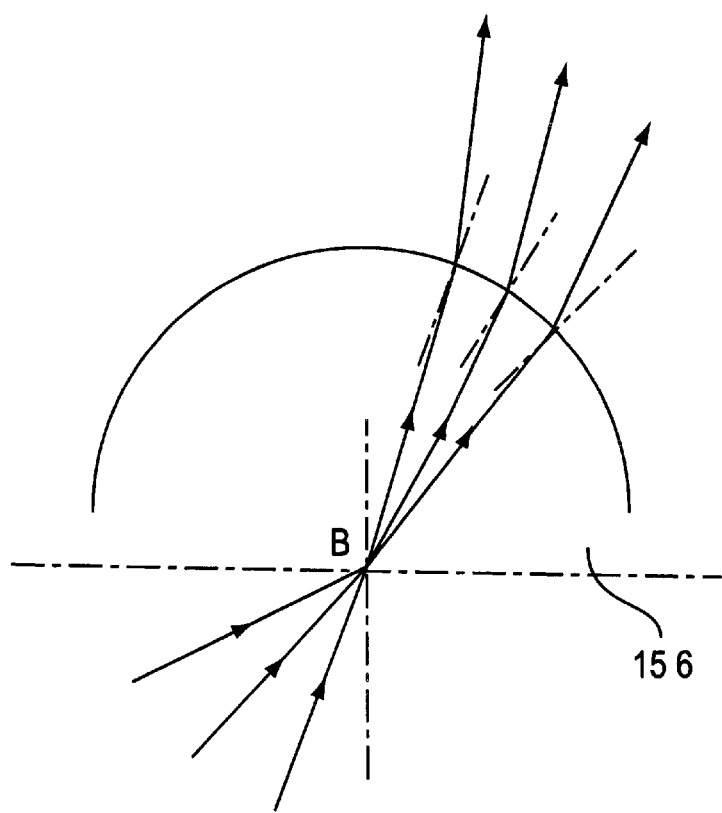
FIG. 16 illustrates the operation of the lenticular plate used for the liquid crystal display device of the present invention.

Lenticular plate 156 is arranged so that the sides of the partial cylinders face liquid crystal panel 153. FIG. 16 illustrates how a lenticular lens induces light beam directionality to diffused light. In FIG. 16, when diffused light is incident on the base plane of lenticular lens 166, any point B on the plane receives light beams from all directions. The light beams are refracted according to Snell's law depending on the difference in index of refraction between air and glass. Since the index of refraction of glass is larger than that of air, the angle of refraction is smaller than the angle of incidence. The refracted beams are refracted again on the side of the partial cylinder according to Snell's law and exit the lenticular lens. Although at this boundary the angle of refraction in the air is larger than the angle of incidence in the glass, the exiting light beams have a sharper directionality when one sees them in the direction perpendicular to the base plane since the top plane of the lenticular lens is curved with respect to the base plane.

Figure 17:
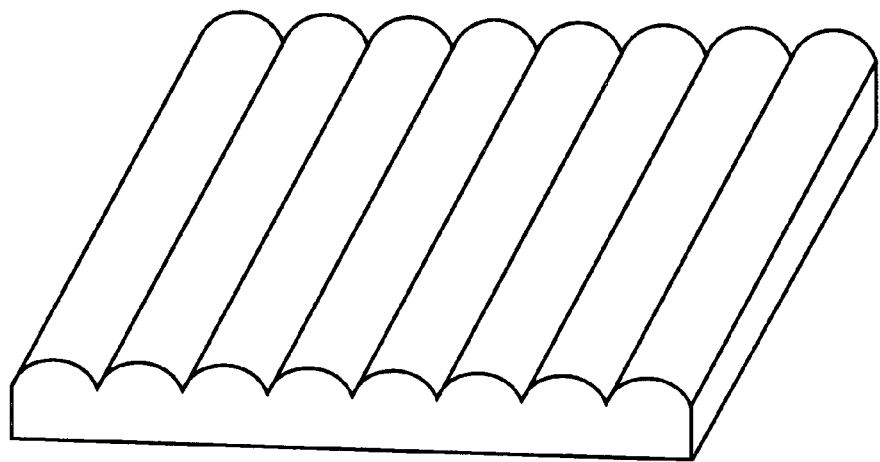
FIG. 17 shows a perspective view of the lenticular plate used for the liquid crystal display device of the present invention.

FIG. 17 shows a perspective view of lenticular plate 156 used in the present invention. The lenticular plate comprises half cylinders arranged side by side parallel to each other. Lenticular plate 156, as shown in FIG. 17, improves the light beam directionality along the direction in which the lenticular lenses are placed in the same way as the prism plate shown in FIG. 13 does, but it has no effect along the direction perpendicular to it. Lenticular plate 156 of the viewfinder of the present invention can be made rotatable so that a viewer can rotate it and set the direction of less directionality parallel to the direction of eye movement because a low directionality gives rise to a broad viewing angle.

Figure 18:
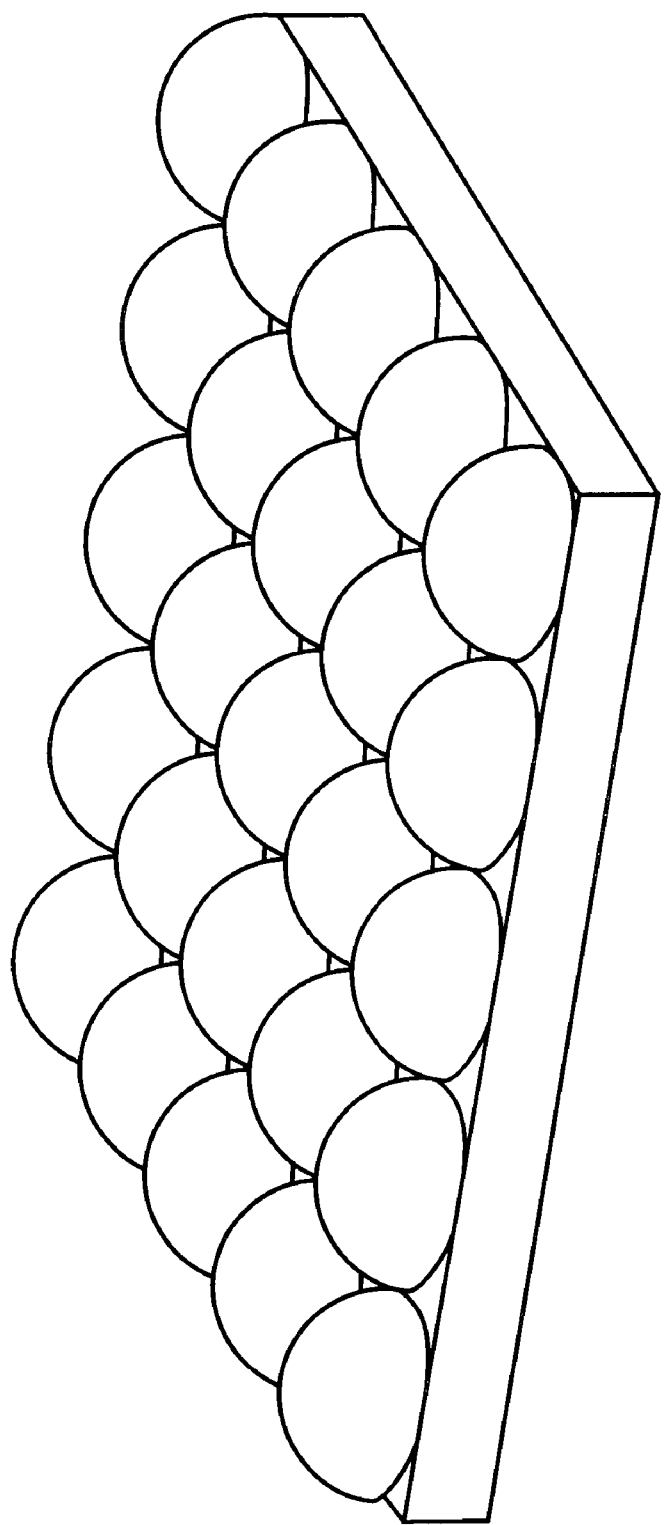
FIG. 18 shows a perspective view of the lenticular plate used for the liquid crystal display device of the present invention.

In order to improve the light beam directionality in both directions one may use a lens array plate with lenses arranged side by side as shown in FIG. 18.

Figure 19:
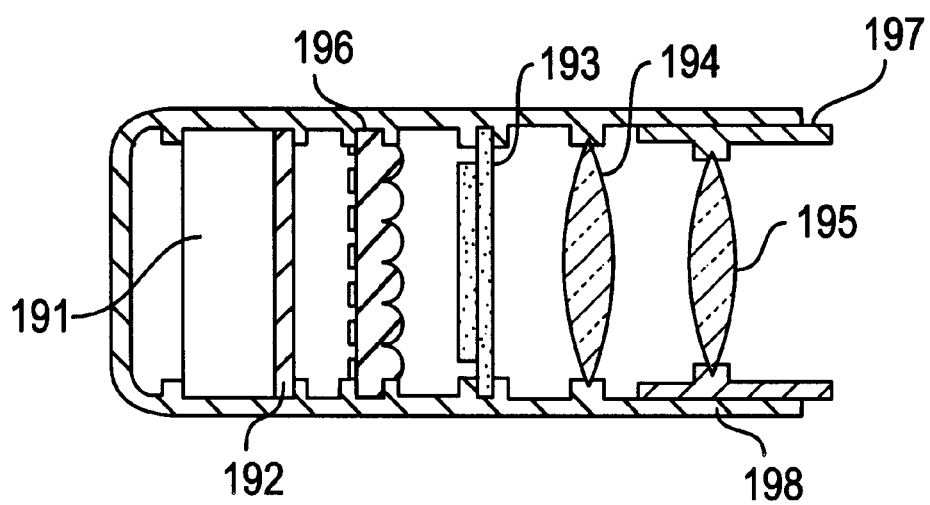
FIG. 19 shows a cross section of the liquid crystal display device of the seventh embodiment of the present invention.

FIG. 19 shows the seventh embodiment of the present invention of a liquid crystal display device. In the figure, reference numeral 191 is a light source; 192, a diffusion plate; 193, a polymer-dispersed liquid crystal panel; 194 and 195, magnifying lenses; 196, a lens array plate.

Diffusion plate 192 functions as a uniform light source, scattering the light beams emitted from light source 191 in all directions. Lens array plate 196 allows the scattered light beams from diffusion plate 192 to pass through it and exit going only within certain angles toward liquid crystal panel 193. Liquid crystal panel 193 forms images on it as it changes its scattering efficiency according to image signals. The image on the panel is magnified with lenses 194 and 195 and is seen by a viewer.

Figure 20:
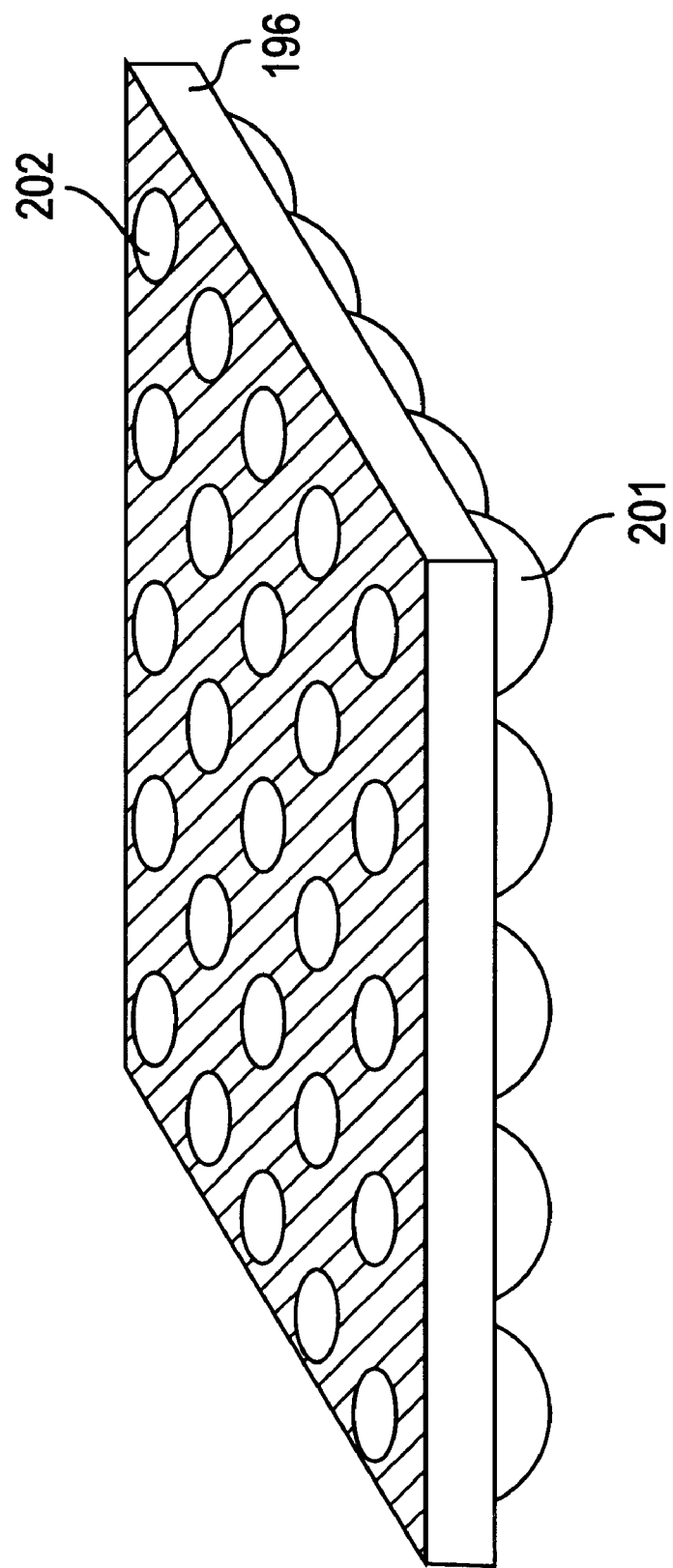
FIG. 20 shows a perspective view of the lens array used for the liquid crystal display device of the present invention.

Lens array plate 196 comprises a plurality of lenses 201 as shown in FIG. 20, each coupled to a small hole (aperture 202) on the bottom. The lens array plate is placed so that the apertures face light source 191. In this configuration, aperture 202 limits the angles of incidence of the diffused light to the lens 201, which then improves the light beam directionality. A lenticular plate, as shown in FIG. 17, and a lens array plate, as shown in FIG. 18, can also have apertures on the side facing the light source.

Figure 29:
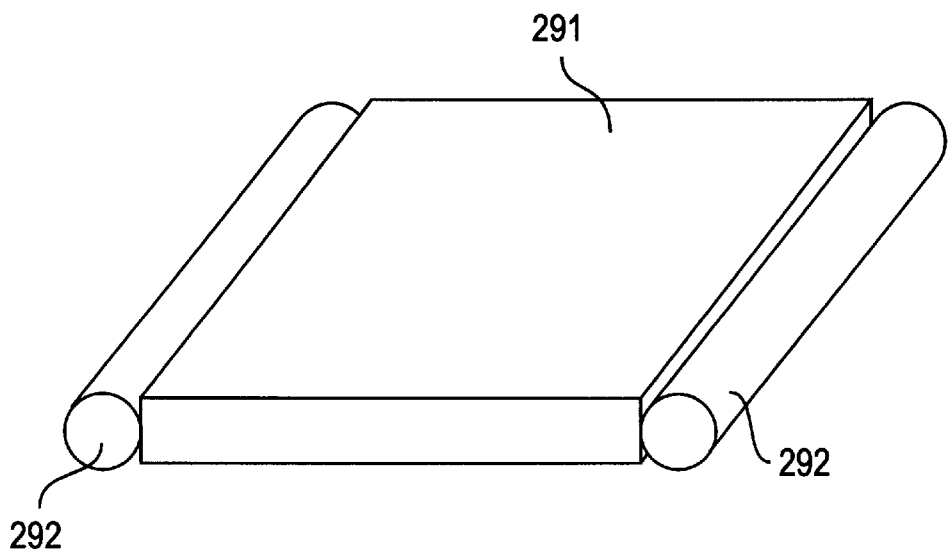
FIG. 29 shows a perspective view of back lighting.
Figure 30:
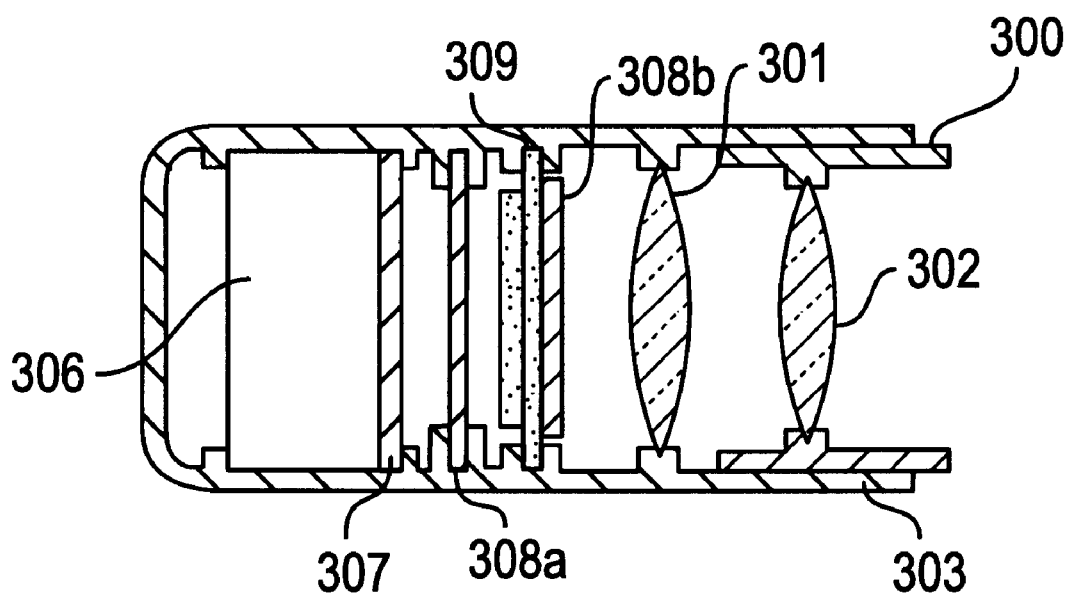
FIG. 30 shows a cross section of a conventional viewfinder.
Figure 31:
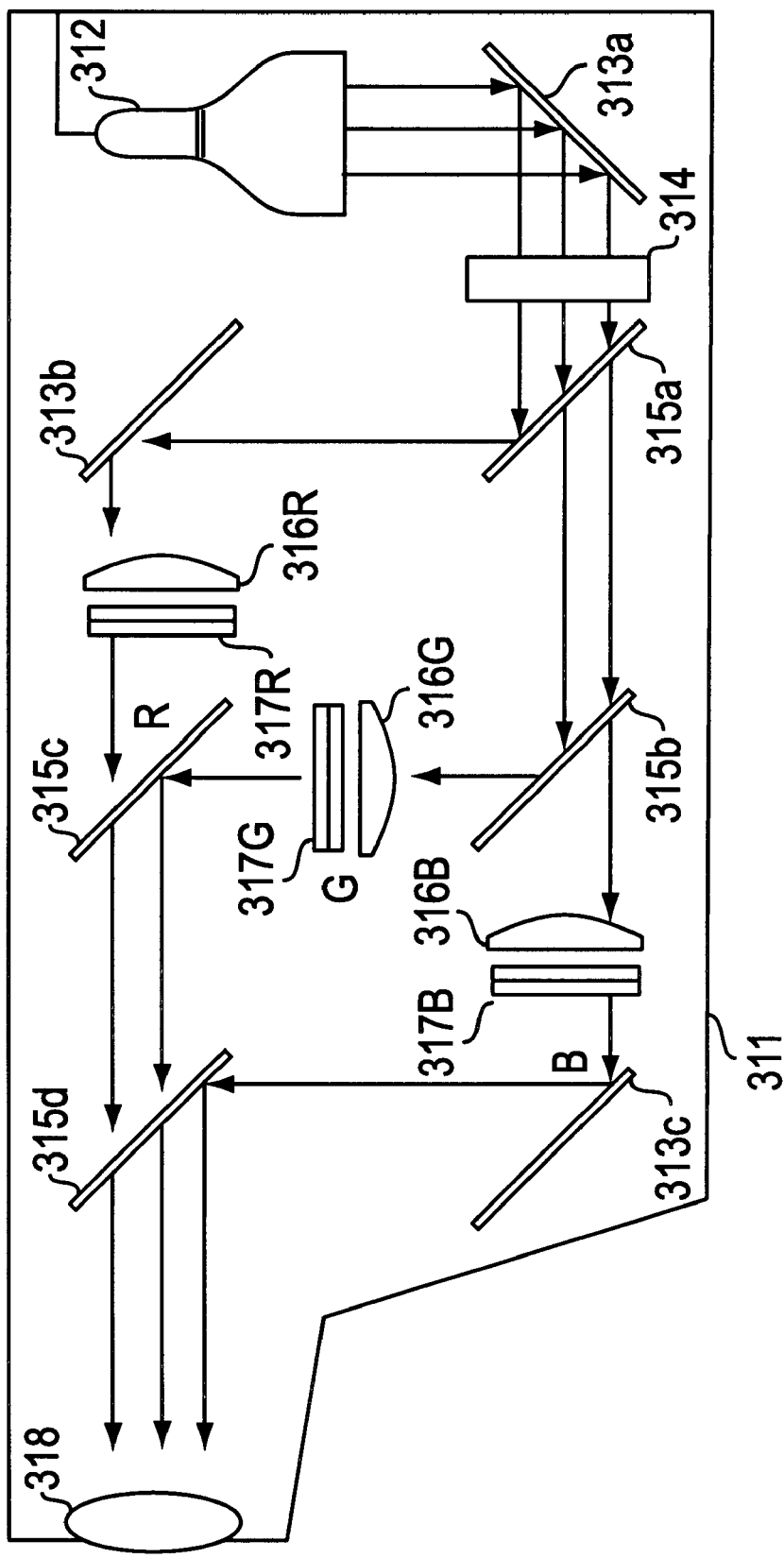
FIG. 31 shows a schematic view of a conventional liquid crystal projection display device.

All the viewfinders illustrated so far are direct view liquid crystal panels when the magnifying lenses are removed. For a larger area liquid crystal panel, one can use back lighting, as shown in FIG. 29, as light sources with the same arrangement as described above.

Figure 21:
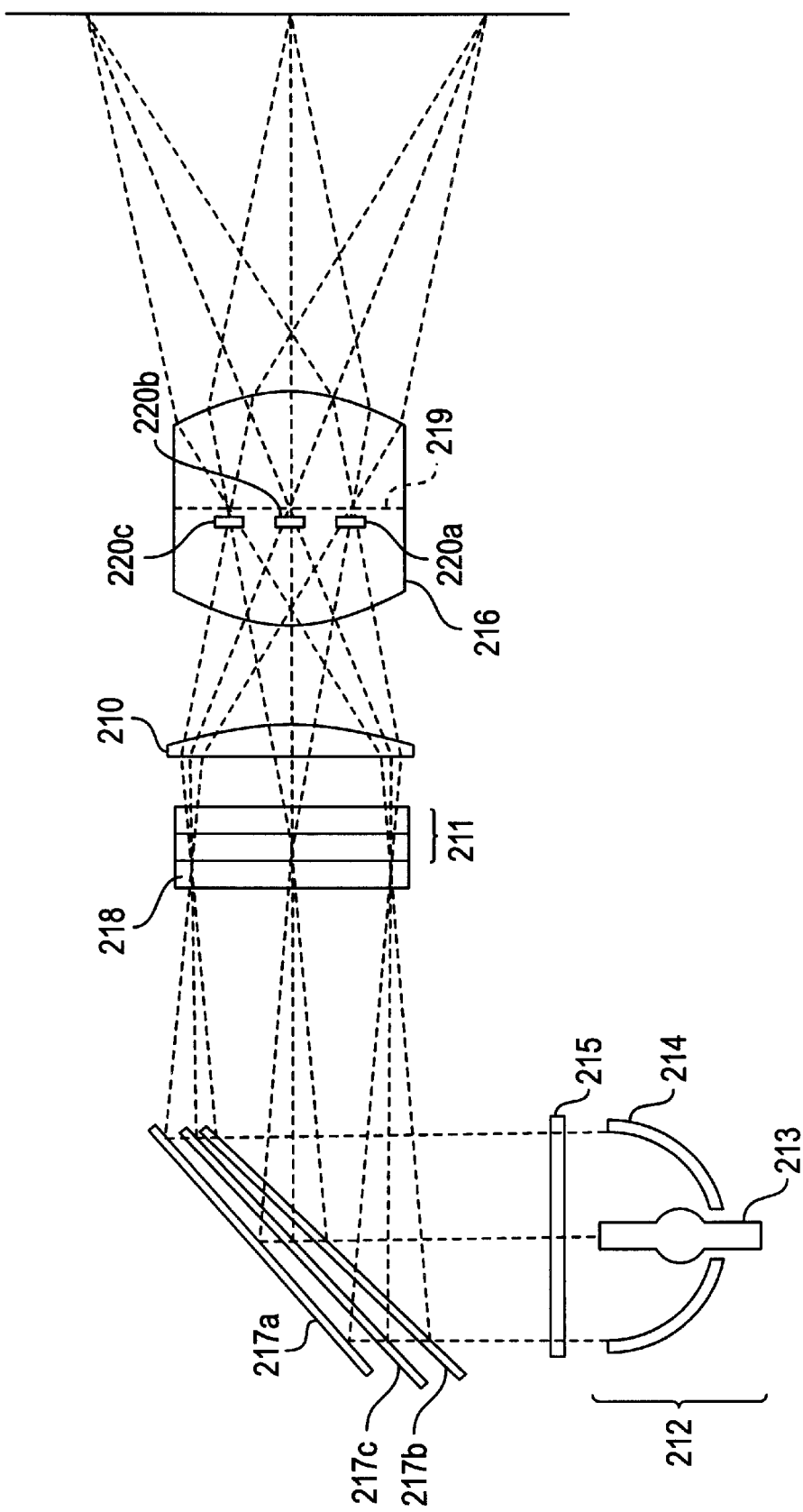
FIG. 21 shows a schematic view of the liquid crystal projection display device of the first embodiment of the present invention.

FIG. 21 shows the first embodiment of a liquid crystal projection display device of the present invention. Reference numeral 211 is a polymer-dispersed liquid crystal panel; 212, a light source; 216, a projection lens.

Light source 212, as a means for generating light, comprises lamp 213 and concave mirror 214. White light emitted from lamp 213 is collimated with concave mirror 214. Thus the light beams from light source 212 have a relatively high light beam directionality. UV and IR cut filters are placed at the exit of light source 212 in order to remove the UV and infrared light and pass only the visible light through them. Lamp 213 may be a halogen lamp, a xenon lamp, a metal halide lamp, and the like. In this embodiment a metal halide lamp is used because it allows great brightness, long life, and low power consumption.

Light beams from light source 212 are color-separated into red (R), green (G), and blue (B) with dichroic mirrors 217a, 217b, and 217c, respectively. The three color-separated light beams illuminate a liquid crystal panel. Since a large angle of incidence to the dichroic mirrors results in poor color separation, light source 212 must be positioned properly.

Microlens array 218, as a means for bending the light beams, is placed in front of liquid crystal panel 211. Microlens array 218 has a structure shown in FIG. 18. Refractive index distributed lenses, which are formed on a plate having distributed refractive indexes over it and function as lenses, may also be used. The function of microlens array 218 is described in more detail with reference to FIG. 22.

Figure 22:
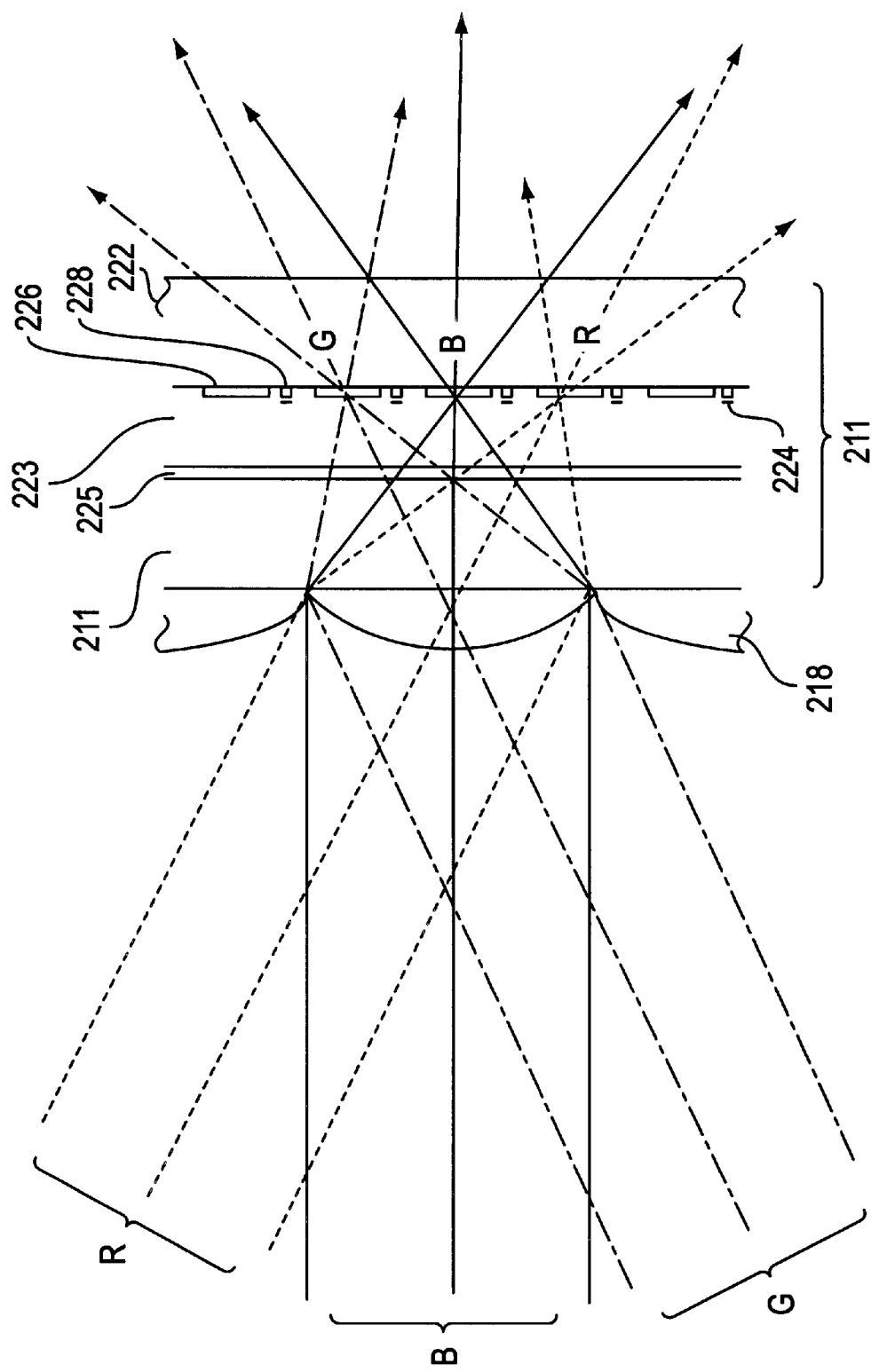
FIG. 22 shows an enlarged cross section of the liquid crystal panel portion of the liquid crystal projection display device of the present invention.

FIG. 22 shows an enlarged cross section of the liquid crystal panel portion of the liquid crystal projection display device of the present invention. Liquid crystal panel 211 comprises two transparent substrates 221 and 222, and a polymer-dispersed liquid crystal layer 223 between them. Transparent electrodes (pixel electrodes 226 and opposing electrodes 225) are formed on the sides of substrates 221 and 222, which are in contact with the liquid crystal. Pixel electrodes 226 are formed in a matrix, and TFTs 228 as switching devices are formed near each pixel electrode. Each TFT is connected to a source signal line (not shown) and gate signal line (not shown), which are in turn coupled to a signal supply circuit and scanning circuit, respectively. A signal voltage is applied through a TFT to each pixel. Polymer-dispersed liquid crystal 223 transmits incident light beams straight without scattering when a sufficiently high voltage is applied to the liquid crystal, while it scatters the incident light beams in the absence of the applied voltage. Therefore, the scattering efficiency of each pixel can be controlled by the applied voltage.

A light blocking layer 224 is formed on top of each TFT 228 to suppress the photoconductivity of the TFT. Light blocking layers 224 may also cover signal lines. These layers work as a black matrix. If they are formed on the opposing substrate 221, as in the conventional way, they reduce the aperture ratio for those incident light beams with a large angle of incidence.

Each of the RGB lights which is color separated with the dichroic mirrors, is refracted and focused onto a different pixel with microlens array 218. Therefore, each lens of microlens array 218 is associated with three pixels of liquid crystal panel 211, each pixel modulating one of the RGB lights. This scheme allows a single liquid crystal panel to modulate each RGB independently without using color filters.

The arrangement of the RGB is as follows. The scattering property of a polymer-dispersed liquid crystal panel is wavelength dependent: as wavelength increases the scattering efficiency decreases. If an angle of incidence is made larger for a longer wavelength, the light path through the liquid crystal layer is also longer, which compensates for the wavelength dependence of scattering.

Each RGB light modulated at pixels of liquid crystal panel 211 forms images of the light source near the pupil of projection lens 216. Apertures 219 have similar shapes to the images of the light source. A field lens 210 functions as a Schlieren lens, but the system works properly without it.

Projection lens 216 receives light beams exiting each pixel going within a certain solid angle. The solid angle is determined by the area of the aperture. If the area of the aperture is larger than that of the image of the light source, aperture lens 216 receives more light than necessary and a dark image becomes brighter. If the area of the aperture is smaller than that of the image of the light source, however, aperture lens 216 does not receive the full amount of light and a bright image becomes darker. Therefore, the apertures for each of the RGB lights which have the same shape as the image of the light source for RGB, respectively, give rise to an improved contrast ratio.

However, since each RGB light has its own aperture corresponding to its image of the light source, scattered R light enters the apertures for G and B light, causing the contrast ratio to degrade. The degradation of the contrast ratio results from scattered G and B light, also. In the present invention, therefore, color filters 220a, 220b, and 220c are placed on the apertures to filter only selected colors. Since those color filters pass only one of R, G, and B lights, respectively, the scattered R light is absorbed by color filter 220b and 220c and does not go through them even if it reaches the apertures for G and B. Since color filters 220a transmit only R light, the R light comes out only from the apertures for R. This is also true with scattered G and B light. Accordingly, those color filters further improve the contrast ratio.

Obviously, when color filters are used, one may shield the rest of the area and use them as apertures without creating separate apertures.

Figure 23:
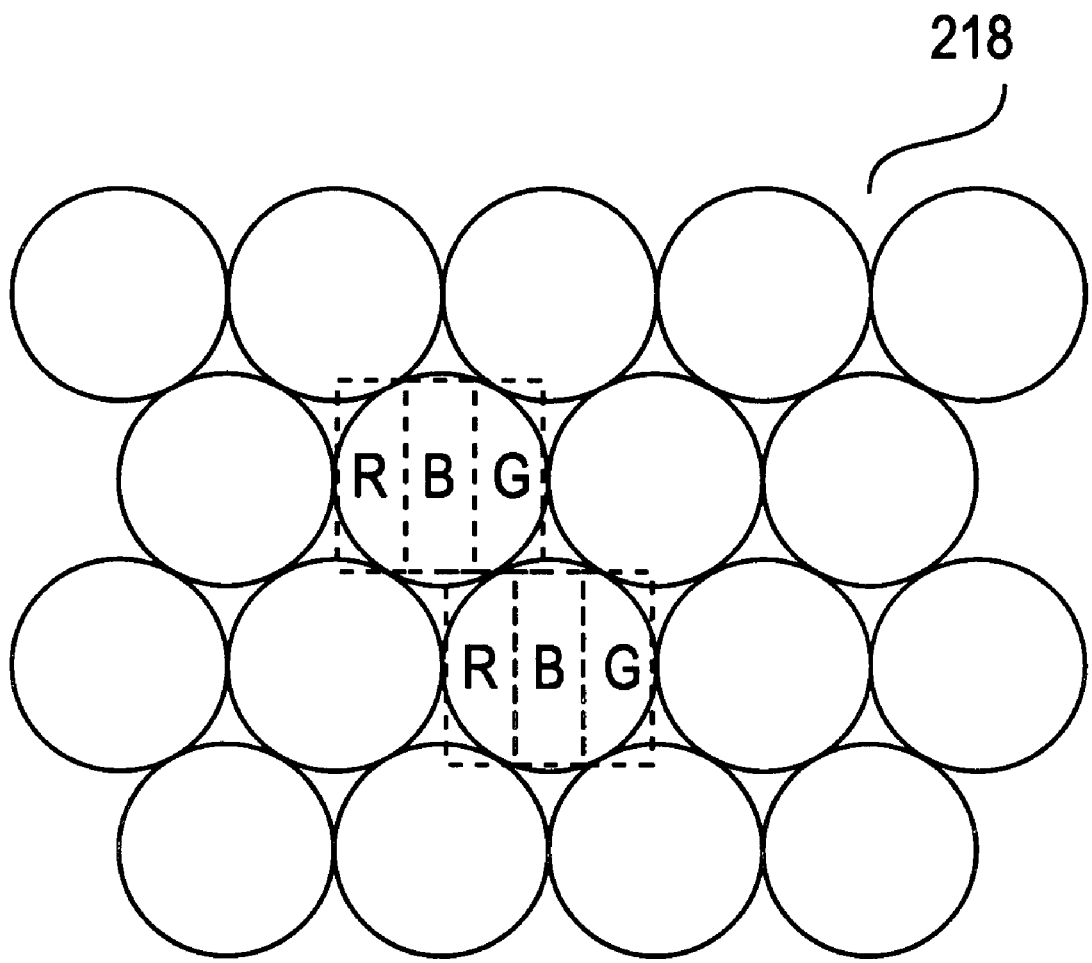
FIG. 23 shows a top view of the lens array used for the liquid crystal projection display device of the present invention.

Microlens array 218 may be replaced with lenticular lenses as shown in FIG. 17. The microlenses may be staggered, as shown in FIG. 23, so that pixels for one color do not line up in a straight line. The microlenses are arranged so that one lens corresponds to three pixels.

Figure 24:
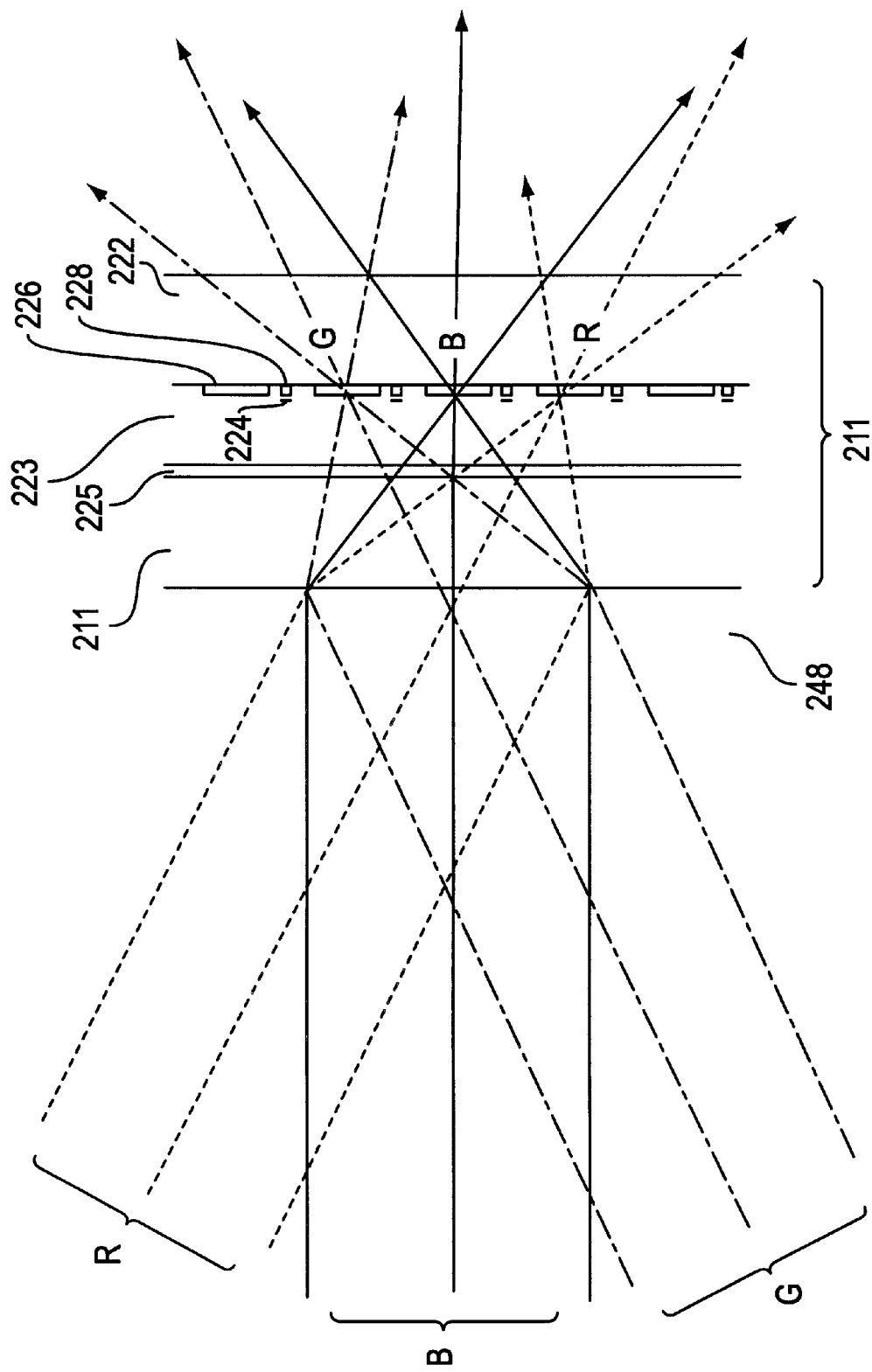
FIG. 24 shows an enlarged cross section of the liquid crystal panel portion of the liquid crystal projection display device of the present invention.

FIG. 24 illustrates a cross section of a liquid crystal panel portion of the liquid crystal projection display device of the present invention which employs a prism sheet as shown in FIG. 13. The other portion of the liquid crystal projection display device is the same as that shown in FIG. 21. Reference numeral 211 is a polymer-dispersed liquid crystal panel, and 248 is a prism sheet in which the tops of the prisms are chopped off. The RGB lights color-separated by the dichroic mirrors, is refracted by prism sheet 248 and passes through different pixels. One prism of prism sheet 248 corresponds to three pixels of liquid crystal panel 211, each modulating one of the RGB lights. This configuration allows the liquid crystal panel to modulate each RGB light independently without using color filters as in the case shown in FIG. 22.

Figure 25:
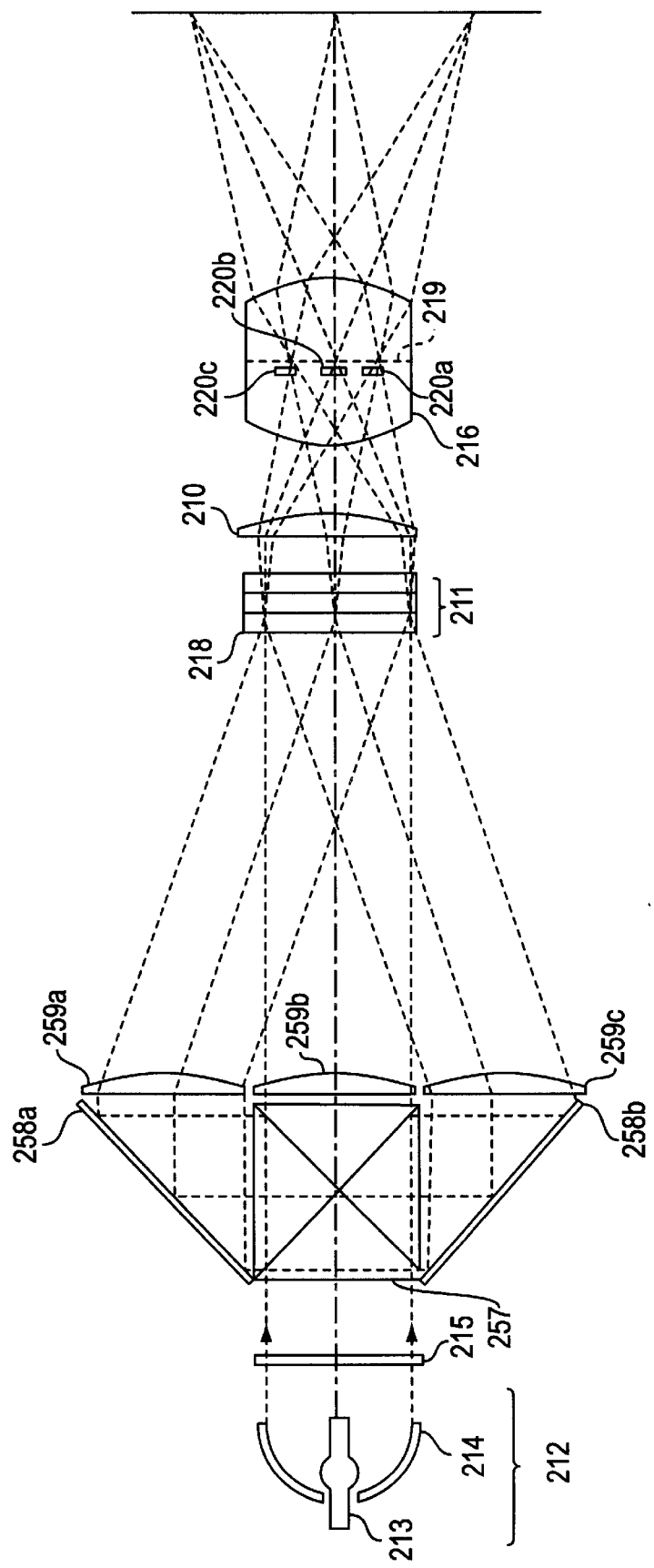
FIG. 25 shows a schematic view of the liquid crystal projection display device of the second embodiment of the present invention.
Figure 26A:
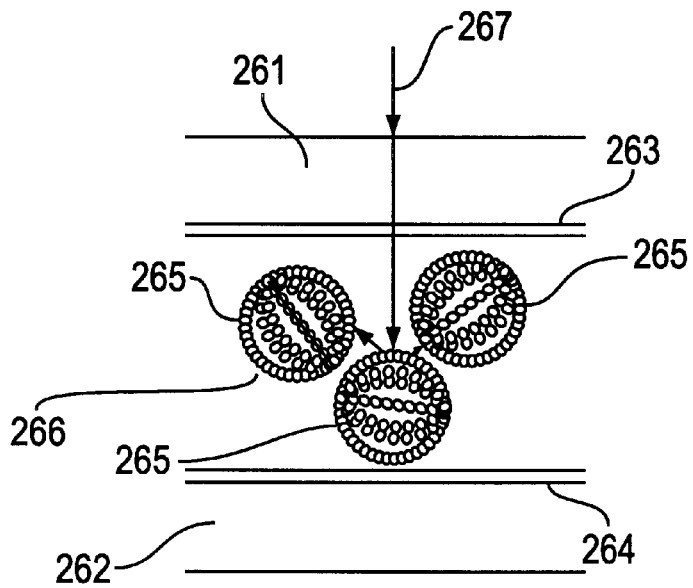
FIGS. 26A and 26B illustrate the operation of the polymer-dispersed liquid crystal panel.
Figure 26B:
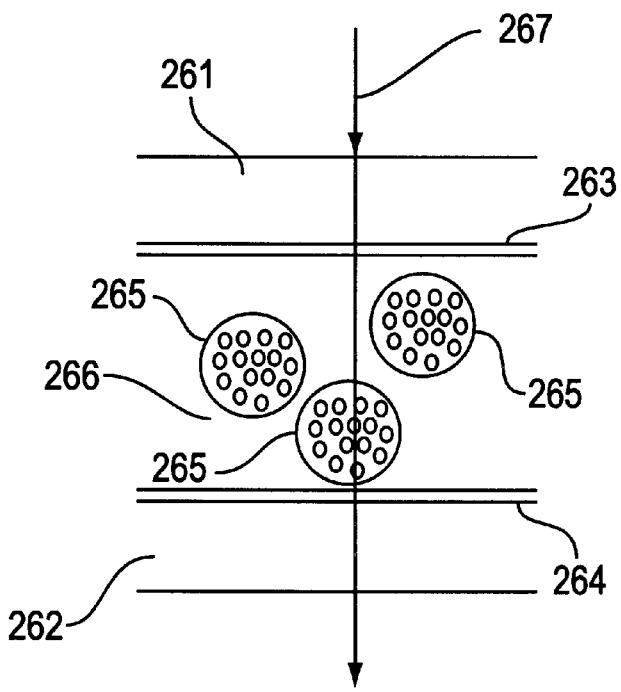

FIG. 25 shows the second embodiment of a liquid crystal projection display device of the present invention. Reference numeral 211 is a polymer-dispersed liquid crystal panel; 212, a light source; 216, a projection lens, of which configuration is the same as the system shown in FIG. 21. The difference, however, is that in this embodiment we use dichroic prism 257 as a means for color separation. White light from light source 212 is color-separated into RGB with dichroic prism 257 and directed toward liquid crystal panel 211 by mirrors 258a and 258b and lenses 259a, 259b, and 259c.

It is apparent that in the above liquid crystal projection display devices of the present invention a plurality of color light sources could be used for a light generating means instead of using a means for color separation and the liquid crystal panel is illuminated with light beams from the color light sources with different angles.

What is claimed is:

1. A liquid crystal display device comprising:

a light generation means;

a light diffusion means for diffusing light beams emitted from said light generation means;

light directivity control means for controlling the directivity of the light beams diffused by said light diffusion means;

a liquid crystal display panel for forming an optical image thereon as a result of a variation in scattering state of light beams therein; and an image magnification display means for magnifying the image on said liquid crystal display panel so that the image becomes observable, wherein said light directivity control means consists of a lenticular lens with a plurality of half cylinder lenses, said lenticular lens having a light-shielded bottom surface and a plurality of apertures formed on the light-shielded bottom surface corresponding to said plurality of half cylinder lenses, said plurality of apertures being displaced at a pitch different from a pixel pitch of said liquid crystal panel, and said lenticular lens being placed with the sides of the cylinders of said lenticular lens facing said liquid crystal display panel between said light diffusion means and liquid crystal display panel.

2. A liquid crystal display device comprising:

a light generation means;

a light diffusion means for diffusing light beams emitted from said light generation means;

a light directivity control means for controlling the directivity of the light beams diffused by said light diffusion means;

a liquid crystal display panel for forming an optical image thereon as a result of a variation in scattering state of light beams therein, and an image magnification display means for magnifying the image formed on said liquid crystal display panel so that the image becomes observable, wherein said light directivity control means consists of an assemblage of microlenses having a plurality of apertures formed on a light-shielded bottom surface of said assemblage of microlenses corresponding to individual microlenses, said plurality of apertures being displaced at a pitch different from a pixel of pitches of said liquid crystal panel, said assemblage being arranged with said apertures facing said light generation means.

* * * * *